United States Patent
Schwartz et al.

(10) Patent No.: US 10,652,180 B1
(45) Date of Patent: May 12, 2020

(54) SYSTEMS, METHODS AND PRODUCTS FOR MICRO-CONTENT CREATION, ORGANIZATION, ANALYSIS, AND PUBLICATION

(71) Applicant: 4MORE INNOVATION, Toronto (CA)

(72) Inventors: Tal Schwartz, Toronto (CA); Gary Schwartz, Toronto (CA); Alexander Ostrow, Toronto (CA)

(73) Assignee: 4MORE INNOVATION, Toronto (CA)

( * ) Notice: Subject to any disclaimer, the term of this patent is extended or adjusted under 35 U.S.C. 154(b) by 291 days.

(21) Appl. No.: 15/363,804

(22) Filed: Nov. 29, 2016

Related U.S. Application Data

(63) Continuation-in-part of application No. 14/714,934, filed on May 18, 2015, now abandoned.

(60) Provisional application No. 61/994,813, filed on May 16, 2014.

(51) Int. Cl.
*H04L 12/58* (2006.01)
*H04L 29/08* (2006.01)
*G06F 16/22* (2019.01)
*G06F 16/25* (2019.01)

(52) U.S. Cl.
CPC ............ *H04L 51/063* (2013.01); *G06F 16/22* (2019.01); *G06F 16/25* (2019.01); *H04L 51/066* (2013.01); *H04L 51/16* (2013.01); *H04L 51/32* (2013.01); *H04L 67/06* (2013.01); *H04L 67/306* (2013.01)

(58) Field of Classification Search
CPC .................. H04L 51/063; G06F 17/30312
See application file for complete search history.

(56) References Cited

U.S. PATENT DOCUMENTS

| | | | | |
|---|---|---|---|---|
| 2013/0046826 | A1* | 2/2013 | Stanton | G06Q 10/10 709/204 |
| 2013/0191763 | A1* | 7/2013 | Jones | H04L 67/36 715/753 |
| 2014/0317186 | A1* | 10/2014 | Niemi | G06Q 10/10 709/204 |
| 2015/0046842 | A1* | 2/2015 | Barr | H04L 65/403 715/753 |
| 2015/0082462 | A1* | 3/2015 | Pearlman | H04L 63/104 726/28 |

(Continued)

*Primary Examiner* — Jensen Hu
(74) *Attorney, Agent, or Firm* — Dentons US LLP

(57) ABSTRACT

Disclosed are systems, methods, and products for creating, organizing, storing, archiving and publishing content and data points on a real-time basis based on multiple inputs from different sources, including the creation of content and data within the application, the creation of related or summary content and data on social media platforms, the facilitation of non-curated external interactions on social media platforms about, or related to, the curated content and data, and the inclusion of content and data extracted from social media platforms in response to related or summary content and data. The system, methods and products permit variable content moderation during the content creation process dependent on assigned roles. These systems and methods permit assignment of roles for the purpose of curated interactions and allow for content from multiple content providers to be juxtaposed in a dialogue or interview or debate format rather than individual, concatenated feeds.

20 Claims, 17 Drawing Sheets

(56) References Cited

U.S. PATENT DOCUMENTS

2015/0088622 A1\* 3/2015 Ganschow ............. G06Q 50/01
　　　　　　　　　　　　　　　　　　　　　705/14.5
2016/0292509 A1\* 10/2016 Kaps ................. G06K 9/00718

\* cited by examiner

SYSTEMS, METHODS AND PRODUCTS FOR MICRO-CONTENT CREATION, ORGANIZATION, ANALYSIS, AND PUBLICATION

CROSS-REFERENCE TO RELATED APPLICATION

This application is a continuation-in-part of U.S. Non-Provisional patent application Ser. No. 14/714,934, titled "Systems, Methods and Products for Micro-Content Creation, Organization, Analysis, and Publication," filed May 18, 2015, which claims priority to U.S. Provisional Patent Application No. 61/994,813, titled "Systems, Methods and Products for Micro-Content Creation, Organization, Analysis, and Publication," filed May 16, 2014, which are incorporated by reference herein in their entireties.

TECHNICAL FIELD

The present application relates generally to facilitating, organizing, analyzing, publishing, and archiving content and data points from various social media interactions across different platforms.

BACKGROUND

Currently, social media sites, social media management platform solution sites, blogging sites, and micro-blogging sites, such as Twitter®, currently cultivate content by selectively choosing from existing social media posts and organizing them on a post hoc basis into narratives. This approach is referred to as social storytelling or timeline editing. The same is true with respect to databases of information, which currently generate reports and analyses by selectively choosing from existing data entries and organizing them on a post hoc basis.

People would like to host events with social media, whether the event is entirely digital or as a complement to a physical event, but doing so is not easy because social media sites and databases do not allow or facilitate the real time creation of narratives or organization of data cultivated through real-time interactions among individual content providers or data points.

Conventional tools and systems on social media sites, social media management platform solution sites, blogging sites, and micro-blogging sites, such as Twitter®, are not suited for developing, delivering, distributing, publishing, analyzing and retrieving content or data points associated with time-sensitive events. Such systems often involve disparate software tools for managing the various tasks, thereby resulting in difficult to find content that cannot easily be manipulated. The conventional tools and systems do not permit the ability to conclude content created for a specific event, so it is impossible to create a beginning and an ending to an event. Also, because most social media platforms organize posts and content by most recent to oldest, archived collections of content are lost within an indistinguishable stream of other content. Moreover, conventional tools and systems offer no protection against tag or event identification conflict, so unrelated content, or low quality content, shows up in the same feed that organizers would like to use for an event. Finally, the conventional tools do not permit content collection moderation, and they do not permit moderation powers and authority to be customized for a specific event. Without editorial oversight and limited participation, the conventional tools and systems offer no protection against inaccurate or malicious content appearing in the same feed or becoming part of the online event.

What is needed is a means for permitting multiple selected individual content providers or data points to interact, or be manipulated, on a real-time basis in an organized manner that can be stored, distributed, published, analyzed, and retrieved in various different formats and for different purposes.

SUMMARY

Disclosed herein is a system and method for creating and organizing content and data points on a real-time basis based on multiple inputs and postings from different sources, including curating content and data from different sources, which are then embedded into other social media platforms as content posts with a link back to the original content and the curated interaction. This curated interaction can be stored, distributed, published, analyzed, and retrieved in various different formats and for different purposes.

Disclosed herein is a system and method for creating and organizing content and data points on a real-time basis that includes facilitation of non-curated interactions between individuals on multiple existing social media platforms about, or related to, the curated content and data on a non-transitory storage medium, such as a computer disk in an organized manner that can be stored, distributed, published, analyzed, and retrieved in various different formats and for different purposes.

Certain embodiments include a computer-implemented method to present time-demarcated information. The method includes the steps of transmitting, by an application server, an event identifier associated with a plurality of event parameters to each of a plurality of computing devices accessed by a plurality of participant profiles, the event parameters being two or more of event start time, event duration, event end time, and event topic; selecting at least two content provider profiles from the plurality of participant profiles; receiving and storing in a database a plurality of content files provided by the computing devices of the at least two content provider profiles, the plurality of content files provided in response to the event identifier. The method further includes the steps of querying the database, by the application server, to retrieve a plurality of selective information from the plurality of content files conforming to the event parameters; and transmitting, by the application server, the plurality of selective information and corresponding content provider profile to two or more of the plurality of the computing devices to render a user interface presenting each of the plurality of selective information and corresponding content provider profile in a curated format. The method can include, in certain embodiments, the step of transmitting, by the application server, each of the plurality of selective information and the corresponding content provider profile in the curated format to a social media platform server through a secure communication protocol. The application server can be designed to receive the plurality of content files from the plurality of content provider profiles only during a time interval associated with the event identifier. The method can include, in certain embodiments, the step of updating, by the application server, the interface associated with the event identifier on one or more of the plurality of the computing devices to present each of the plurality of selective information and the corresponding content provider profile in real-time. The curated format can be a juxtaposition of each of the plurality of selective information and the corresponding content provider identifier in a dialogue format. The curated format can be a juxtaposition of each of the plurality of selective information and the corresponding content provider identifier in a debate format. The curated format can be a juxtaposition of each of the plurality of selective information and the corresponding content provider identifier in an interview format.

Certain embodiments include a computer-implemented method to present a moderated interaction among a plurality of participant profiles. The method includes the steps of transmitting, by an application server, an event identifier associated with a plurality of event parameters to each of a plurality of computing devices accessed by a plurality of participant profiles, the event parameters being two or more of event start time, event duration, event end time, and event topic; transmitting, by the application server, a content provider identifier to each of a plurality of content provider profiles selected from the plurality of participant profiles; receiving, by the application server, and storing in a database a plurality of content files provided by the plurality of content provider profiles, each of the plurality of content files uniquely tagged with a content provider identifier associated with one of the content provider profiles; assigning, by the application server, a moderator identifier to one of the plurality of participant profiles and providing authority to the participant profile associated with the moderator identifier to query the database to identify a plurality of selective information from the plurality of content files conforming to the event parameters; receiving, by the application server, the plurality of selective information; and providing an interface associated to the event identifier on one or more of the plurality of the computing devices to present each of the plurality of selective information and corresponding content provider identifier in a curated format. The curated format can be a juxtaposition of each of the plurality of selective information and the corresponding content provider identifier in a dialogue format. The curated format can be a juxtaposition of each of the plurality of selective information and the corresponding content provider identifier in a debate format. The curated format can be a juxtaposition of each of the plurality of selective information and the corresponding content provider identifier in an interview format. The method can include, in certain embodiments, the step of transmitting, by the application server, each of the plurality of selective information and the corresponding content provider profile in the curated format to a social media platform server through a secure communication protocol. The application server can be designed to receive the plurality of content files from the plurality of content provider profiles only during a time interval associated with the event identifier. The method can include, in certain embodiments, the step of updating, by the application server, the interface associated with the event identifier on one or more of the plurality of the computing devices to present each of the plurality of selective information and the corresponding content provider profile in real-time.

Certain embodiments include a collaborative content creation system. The system includes two or more computing devices, each containing a processor configured to transmit a plurality of content files to an application server; a database hosted by the application server comprising a non-transitory machine-readable storage medium to store the plurality of content files; and an application server comprising a processor communicatively coupled to two or more computing devices, the database, and a social media platform server. The application server is configured to execute a set of instructions to transmit an event identifier associated with a plurality of event parameters to each of a plurality of computing devices accessed by a plurality of participant profiles, the event parameters being two or more of event start time, event duration, event end time, and event topic; select at least two content provider profiles from the plurality of participant profiles; receive and store in the database a plurality of content files provided by the computing devices of the at least two content provider profiles, the plurality of content files provided in response to the event identifier; query the database to retrieve a plurality of selective information from the plurality of content files conforming to the event parameters; transmit the plurality of selective information and corresponding content provider profile to two or more of the plurality of the computing devices to render a user interface presenting each of the plurality of selective information and corresponding content provider profile in a curated format; and transmit the curated output to the social media platform server through a secure communication protocol. The social media platform server can be a Twitter® server. The curated format can be a juxtaposition of each of the plurality of selective information and the corresponding content provider identifier in a dialogue format. The curated output can be a juxtaposition of each of the plurality of selective information and the corresponding content provider identifier in a debate format. The curated output can be a juxtaposition of each of the plurality of selective information and the corresponding content provider identifier in an interview format. In certain embodiments, the two or more computing devices are communicatively coupled to the social media platform server. The processors of the two or more computing devices can be configured to import the plurality of content files from the social media platform server and transmit the plurality of content files to the application server.

In one embodiment, a computer-implemented system comprises an individual's computer including a processor configured to generate a content file and transmit the content file to a central server comprising non-transitory machine-readable storage media storing the content files; a database comprising a non-transitory machine-readable storage medium storing one or more versions of the content files received from the central server wherein the database stores a version of the content file in response to receiving the version of the content file from the central server; central server comprising a processor hosting a collaboration service communicatively coupled to one or more computers of individuals, a database, and a second server, the processor configured to receive the content file from an individual's computer, store the file on the database, display the content file on one or more computers of individuals and provide the content file to one or more secondary servers, and update the content file according to one or more instructions received from one or more computers of individuals, wherein the new content file is stored in the database, displayed on one or more computers of individuals and transmitted to one or more secondary servers.

In one embodiment, a system for assigning roles (e.g., moderator, panelist, content provider, observer) with distinct rights and privileges to specific social media handles or user identities for the purpose of specific, curated interactions so that multiple social media handles or identities can interact on a real-time basis in a dialogue, interview, or debate format (rather than individual, concatenated feeds) in an organized manner that can be stored, distributed, published, analyzed, and retrieved in various different formats and for different purposes on a non-transitory storage medium, such as a computer disk.

In one embodiment, a system for permitting specific, curated, real-time interactions among social media handles or identities from different social media platforms in a dialogue, interview, or debate format that can be viewed on any or all of the different social media platforms being used by the participants in the specific, curated, real-time interaction or on a website (rather than individual, concatenated feeds on a single social media platform) in an organized manner that can be stored, distributed, published, analyzed, and retrieved in various different formats and for different purposes on a non-transitory storage medium, such as a computer disk.

In one embodiment, a system for assigning categories with distinct characteristics to specific data points or groups of data from different programs or platforms for the purpose of collecting, organizing, analyzing, or displaying such data on a real-time basis, which can subsequently be archived, using any or all of the different programs or platforms from which the data comes, or a website, rather than needing to first import all data from the various different programs or platforms into a single program or platform using an individual non-transitory storage medium, such as a computer disk.

It is to be understood that both the foregoing general description and the following detailed description are exemplary and explanatory and are intended to provide further explanation of the invention as claimed on a non-transitory storage medium, such as a computer disk.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1A:
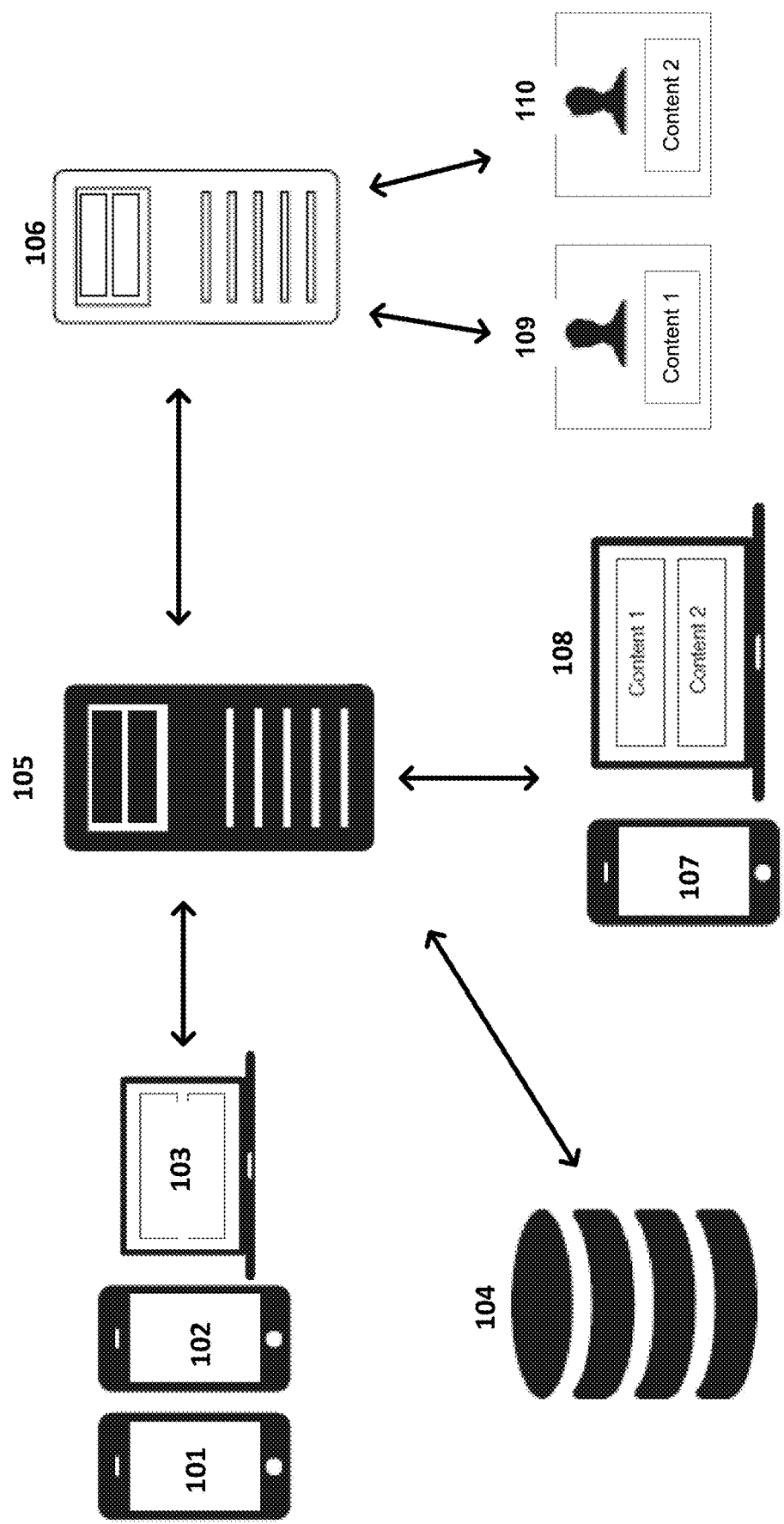
FIG. 1A is a diagram of system architecture for an exemplary embodiment of the system and FIG. 1B is a flowchart showing steps of an exemplary embodiment of the curated creation of real-time content based on postings by multiple parties.

Reference will now be made in detail to the preferred embodiments, examples of which are illustrated in the accompanying drawings. The embodiments described herein are intended to be exemplary. One skilled in the art recognizes that numerous alternative components and embodiments may be substituted for the particular examples described herein and still fall within the scope of the invention.

Disclosed are systems, methods, and products for creating, organizing, analyzing, storing, archiving and publishing content and data points on a real-time basis based on multiple inputs and postings from different sources. These methods include the creation of content and data within the application and the creation of related or summary content and data on social media platforms. These methods include the facilitation of non-curated external interactions on social media platforms about, or related to, the curated content and data, and the inclusion of content and data extracted from social media platforms in response to related or summary content and data. The system, methods and products permit the assignment of roles to specific social media handles or computing devices for the purpose of specific curated interactions and allow for the content and data to be juxtaposed in a dialogue or interview or debate format rather than individual, concatenated feeds. The system, methods and products permit variable content moderation during the content creation process dependent on assigned roles. The system, methods and products permit time demarcation for interactions among content providers, and management of user engagement with time demarcated interactions, which can be archived and cataloged in any searchable database. Content can be in many forms, such as text, audio, image, videos files, and combinations thereof.

Methods and systems disclosed herein enable curated content to be created, aggregated, and distributed in specific formats. The curated content can be associated with real-time events, other social media content complementing a physical event, or as a stand-alone digital content strategy, and combinations thereof. Specific unique profiles can be created using the platform, and one or more roles discussed above are assigned to these unique profiles. These individual profiles can be associated to specific persons, corporate entities, brands, products, specific social media handles or other identities for the purpose of specific, curated interactions. The methods disclosed herein permit content from these profiles to be juxtaposed in a dialogue, interview, or debate format rather than individual, concatenated feeds on a non-transitory storage medium, such as a computer memory device.

These systems and methods permit the individual profiles, accessed through user devices, to have specific assigned authority such as a moderator, a panelist, a participant, or an administrator to manage and curate interactions by initiating, posting, viewing, editing, or deleting content posted by individuals who have been assigned as content providers. The systems and methods disclosed herein can function as an audience crowdsourcing engine from the various social media destinations for an event. For example, curated content is created by multiple participants within the application, and this content is then duplicated or posted as a summary on social media platforms such as Twitter. When there are non-curated external interactions on social media platforms about, or related to, the curated content and data, the application can obtain the new content and data from social media platforms and include it back as part of the curated content or optionally provide it as supplementary content to the curated content. Content can be tagged with short links that can facilitate content acquisition, content filtering by one or more of social network, location, language and topic, and data analytics to monitor the dissemination of the content.

These systems and methods permit an individual profile, accessed through user devices, with the assigned role of a moderator to create and manage time-demarcated content on graphical user interfaces. These graphical user interfaces are accessible to participant profiles and/or viewer profiles through their user devices, depending on the accessibility option selected by the moderator profile or the administrator profile for that particular event. These graphical user interfaces allow for time-aware invitations to other moderator profiles, participant profiles and/or viewer profiles. These systems and methods permit time demarcation for interactions between social media handles and data points, and management of user engagement with time demarcated interactions on a non-transitory storage medium, such as a computer disk. The graphical user interfaces on the user devices can also provide a countdown clock to the start of any dialogue, interview, or debate event. These graphical user interfaces can also present timers to the beginning or end of any dialogue, interview, or debate event, and these timers can count up or down, with or without a visual or sound alarm, in a loop or not, and in various colors, sizes and fonts.

Curated interactions are tagged with unique event identifiers, and specific individual profiles, accessed through user devices, with the assigned role of a moderator or administrator, can request the server to stop content creation, aggregation, or publication. After a stop message is received, the curated interaction can be cleaned for content, appropriately tagged, and stored in the database for archival and search purposes.

These systems and methods also provide for notification messages to be sent from the moderator profiles to the panelist profiles by using any of the social medium platforms being curated or through a third-party system accessed by the panelist profiles being notified. The curated content files generated during the interactions, including time-demarcated interactions, can be archived and cataloged in any searchable database on a non-transitory storage medium, such as a computer disk.

In certain embodiments, these systems and methods permit content from individual interactions and data points to be retransmitted or republished in the same platform, including a social medial platform, or in one or more other online platforms, and to be included within a curated interaction file on a non-transitory storage medium, such as a computer disk. The system and method can also track and manage content or data points that are retransmitted or republished by an individual profile participating in multiple curated interactions so that the content or data points are associated with the correct curated interaction on a non-transitory storage medium, such as a computer disk.

These systems and methods permit any participant profile in a curated interaction to send content files or data points to any platform, including a social media platform, and to multiple platforms, including social media platforms, so that the content from the files and data points are presented on graphical user interfaces of devices, accessed by logging into the participant profiles or viewer profiles. The content or data points are thus available on the user devices through proprietary GUIs or using the interfaces provided by platform of choice for the participant profiles regardless of the platform used by the other profiles on a non-transitory storage medium, such as a computer disk.

These systems and methods permit any participant profile to send a feedback message regarding the curated content or data points, or regarding content shared by other participants' profiles, in a curated interaction, as well as the analysis and publication of the feedback to some or all participants and observers on a non-transitory storage medium, such as a computer disk.

These systems and methods permit a user to use his participant profile to view all content associated with a curated interaction, and send a feedback message regarding curated content or data points, or regarding participants or observers, in a curated interaction, as well as the analysis and publication of the feedback to some or all participants and observers on a non-transitory storage medium, such as a computer disk.

Certain embodiments of the system include a collection of servers and processes. The user-facing interfaces for the websites can be based on standards-compliant web design and constructed using pre-prepared web frameworks. Front end development tools can be used to create the responsive interfaces. For example, a website or client application program can be hosted with services such as Netlify® and built with React®. The interfaces can also be rendered as a native desktop or a mobile application. The server application programs can be hosted using cloud-based platform-as-a-service. The server application programs can be built with web application frameworks that run on web servers and provide default structures for a database, a web service, and web pages. For example, the server app can be hosted with Heroku™, and built with Ruby On Rails™. User profiles, contents files, and other data and metadata associated with curated interactions can be stored in one or more databases, including one or more relational or object-document databases, standing alone or in combination with key-value storage systems. For example, a relational database management system can be used as part of the systems described herein to store data securely and allow for retrieval at the request of other software applications. As a more specific example, applications on Heroku can use a variety of relational database services including the PostgreSQL based database systems. In another example, the system includes an in-memory data structure store such as Redis that is used as database, cache and message broker and minimizes querying to the relational databases. The Redis dataset can be hosted as part of a cloud service such as Redis Cloud or ElastiCache. One or more protocols can be implemented to facilitate real-time data transfer from and to the server, browser, and other software applications. For example, real time web socket connections provided by Firebase are used to support the web (browser), mobile app, and server clients.

One of the advantages of certain embodiments of the methods and systems disclosed herein is the protection against tag conflict. Events on social media platforms, such as Instagram® using a single hashtag has no protection against tag conflict, so unrelated low quality posts show up in the event feed. An advantage of the methods and systems disclosed herein, when deployed in the context of a debate or a discussion or collaborative content generation, is the ability to provide special authorities to certain profiles such as the moderation profile. Hashtags become diluted due to an influx of unrelated messages and/or are hijacked by members for unrelated purposes. So a user, who is logged in using a moderation profile, can actually moderate content and limit the scope of the published content to those specific to the event, or related to the messages presented on the GUI for the specific event. Another advantage of certain embodiments is the ability to execute discrete actions for starting and ending interactions among the various participants. Methods disclosed herein can present a content creation window, and open the opportunity to trigger relevant actions. The start and end messages can trigger more than just the beginning and end of publication of content. For example, even before start of the curated interaction, advertising content can be sent to other social media platforms. Upon start, content from the curated interaction may be automatically submitted to media outlets. At the end, data analytics can be executed based on the information acquired during the curated interaction and reports can be generated for further use to stakeholders.

When compared to other content platforms, such as Hootsuite®, Storify®, and LivePress®, systems and methods disclosed herein provide multi author content creation service that is in communication with various social content platforms, such as Twitter®, Facebook®, LinkedIn®, and embedded into online media publications such as newspaper articles or blogs, to obtain content and distribute content. The length of the content that can be provided by this platform is long and curated. In certain embodiments, the collaborative content creation system can be designed, such that participants have one or more specific roles, such as viewer, content provider, or moderator. Events hosted by the systems described herein have time demarcations, such as start time and an end time for content posting and feedback, and contextual content such as introduction, prefaces, conclusions, and feedback. These events can be hosted on websites supported by the application server or can be embedded into a client's website. Moreover, methods disclosed herein also allow for data analytics to measure which participant profile is responsible for driving the most audience click through via social media platforms. In an embodiment, this is achieved by the addition of unique short link URLs (e.g., a bitly.com redirect link) in their posts. Thus, one can leverage the social media popularity of certain participant profiles to increase the popularity of the event. The participants can also leverage their profiles to drive revenue to their personal or corporate brand.

FIG. 1A is a system architecture of an exemplary embodiment comprising mobile or desktop computing devices 101, 102, and 103, a database 104, and application servers 105 and 106 for the curated creation of real-time content based on postings by multiple parties. Users using a mobile or desktop computing device 101, 102, or 103, can navigate to an application server 105. In some embodiments, the application server 105 may establish an encrypted connection with the computing devices 101, 102, or 103 associated with each of the users. The application server 105 prompts the user devices to provide authentication details for the social media application hosted by application server 106 (social media platform server). The authentication details are then sent by application server 105 using JavaScript Object Notation or any other format that uses well-formed text or binary formats like Protocol Buffers to transmit data objects consisting of attribute-value pairs to a social media application programming interface ("API") of social media platform server 106 using OAuth or any protocol that allows secure authorization, and these authorization details are saved to database 104. Application server 105 verifies credentials for social media application hosted by social media platform server 106 using the social media API, and creates or updates the users' authentication credentials in database 104. Application server 105 queries database 104 for authorization grants, and sets up participant profiles for users of computing devices 101, 102, or 103. Application server 105 creates a session for the authenticated participant profiles. One or more of these authenticated users using their participant profiles on the mobile or desktop computing devices 101, 102, or 103 can initiate an event or post content, and assign roles of moderator or content producer to other users on the application server 105 using a request method supported by HTTP protocol. Application server 105 queries database 104 to verify authentication information for participants to whom a role has been assigned. For new users, the application server 105 accesses the social media API on social media platform server 106 to pull the user's profile and store it in database 104. Database 104 can be any persistent data store, such as a relational database management system like PostgreSQL or object store such as MongoDB. Application server 105 sends introduction and start time to each of the participating authenticated users and stores information in database 104. Moderators or panelists using their profiles on mobile or desktop computing devices 101, 102, or 103 can publish or start the panel by submitting a request to application server 105. Application server 105 updates database 104 and then broadcasts the panel to mobile or desktop computing devices 107 or 108 by the application server 105 using websockets or any other bidirectional protocol supporting communications channels. Participating authenticated users using a mobile or desktop computing device 101 or 102 can submit content to an application server 105 via a request method supported by HTTP protocol. The content is then sent using JavaScript Object Notation or any other format that uses well-formed text or binary formats to transmit data objects consisting of attribute-value pairs to a social media API on social media platform server 106 using OAuth or any protocol that allows secure authorization, and saved to database 104. The content is then broadcast to mobile or desktop computing devices 107 or 108 by the application server 105 using websockets or any other bidirectional protocol supporting communications channels. In some cases, the content may be broadcast, using the associated communication protocols, to mobile or desktop computing devices 109 and 110 by the social media application from social media platform server 106. During the panel, application server 105 broadcasts a presence indicator to the mobile or desktop computing device 101, 102, or 103 of any participating authenticated user, such as users logged in using participant profiles on devices such as 107 or 108. For each participating authorized user, the presence indicator is updated by the participant for such authorized user using any mobile or desktop computing device 107 or 108 to indicate activity, presence on page, a timestamp once the user is no longer participating or an indicator that the user never arrived.

An ordinary artisan would appreciate that the term "script," as used herein, refers to software development tool, code, or file that is prepared to effectively execute functions and features associated with certain aspects of a larger software application.

Devices 101, 102, 103, 107, 108, 109, and 110 may be computing device, such as laptops or desktop computers, telephones, smartphones, smart watches, tablets or any device comprising a processor and components capable of communicating with a network and displaying content.

In this embodiment, database 104 is a relational database that utilizes PostgreSQL or any other persistent data store, which permits the collective manipulation of data residing in the database with queries in a query language with persistent object store for software written in an application server programming language, with a programming API for storing and retrieving objects or rows of data.

Application Server 105 is a server capable of hosting applications and executing procedures, including, but not limited to, programs, routines and scripts, for supporting its applied application that is accessible through an API defined by the platform itself or behaving like a virtual machine for running applications and transparently handling connections to the database side on one side and connections to client devices on the other.

Social media platform server 106 is a server capable of hosting social media platforms and other applications and executing procedures, including, but not limited to, programs, routines and scripts, for supporting its applied application that is accessible through an API defined by the platform itself or behaving like a virtual machine for running applications and handling connections by application servers and providing third party access by application servers or client devices on behalf of authenticated users. In certain embodiments, a single server can function as the application server 105 and the social media platform server 106.

Figure 1B:
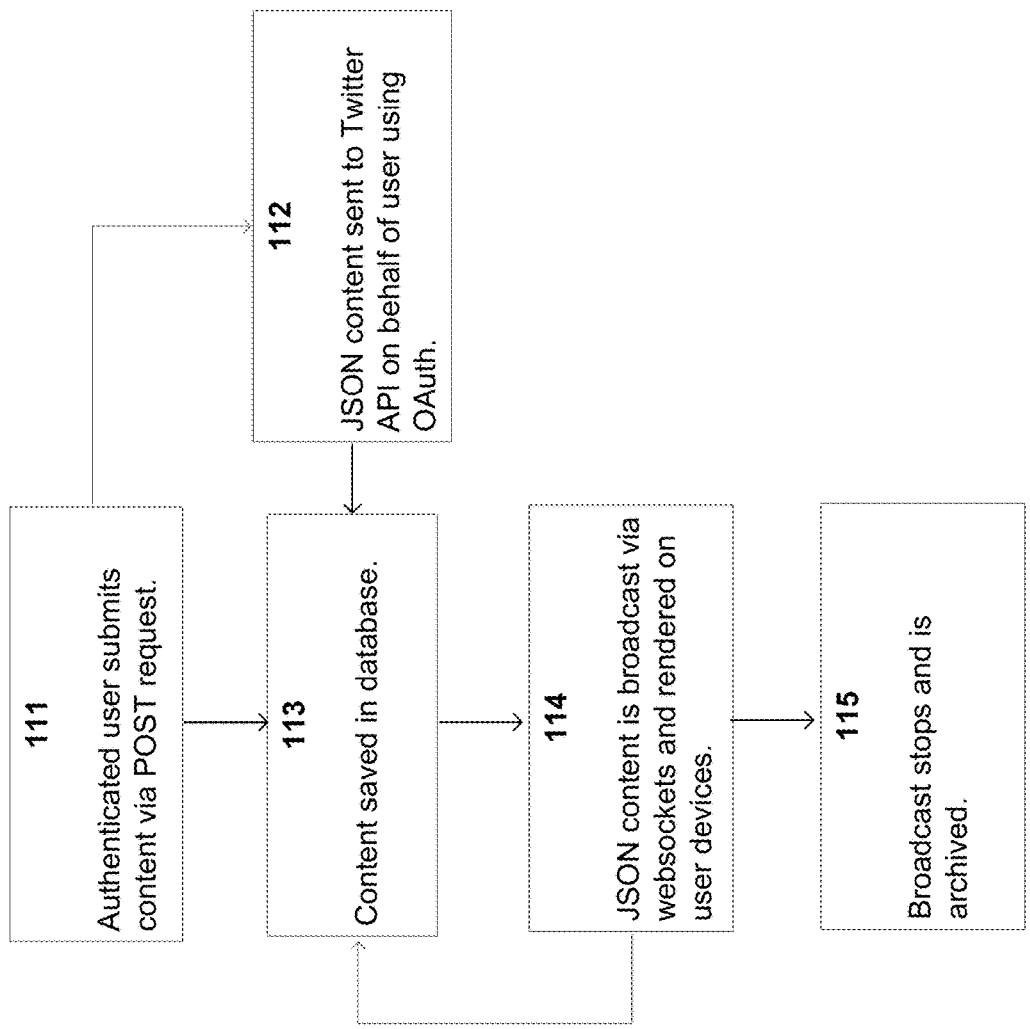

FIG. 1B is a flowchart of method for an exemplary embodiment showing steps of the curated creation of real-time content based on postings by multiple parties, which may comprise mobile or desktop computing devices 101, 102, and 103, a database 104, and application servers 105 and 106. In a session for the authenticated participant profiles created by an application server 105, one or more of these authenticated users using their participant profiles on the mobile or desktop computing devices can create panels and assign roles of moderator or content provider to other users on the application server 105 using a request method supported by HTTP protocol. In step 111, moderators or panelists using their profiles on mobile or desktop computing devices to submit or publish content or start the panel by submitting a request to application server 105. In step 112, the content is sent using JavaScript Object Notation or any other format that uses well-formed text or binary formats to transmit data objects consisting of attribute-value pairs to a social media API on social media platform server 106 using OAuth or any protocol that allows secure authorization, and also saved to database 104. Database 104 can be any persistent data store, such as a relational database management system like PostgreSQL or object store such as MongoDB. In step 113, application server 105 updates database 104, and then in step 114, broadcasts the panel to mobile or desktop computing devices using websockets or any other bidirectional protocol supporting communications channels. At the end of the time-demarcated event, as shown in step 115, the broadcasts of the curated interactions is stopped, conclusions can be posted, surveys or polls can be sent out, and content sent back to the database for archival purposes.

Figure 2A:
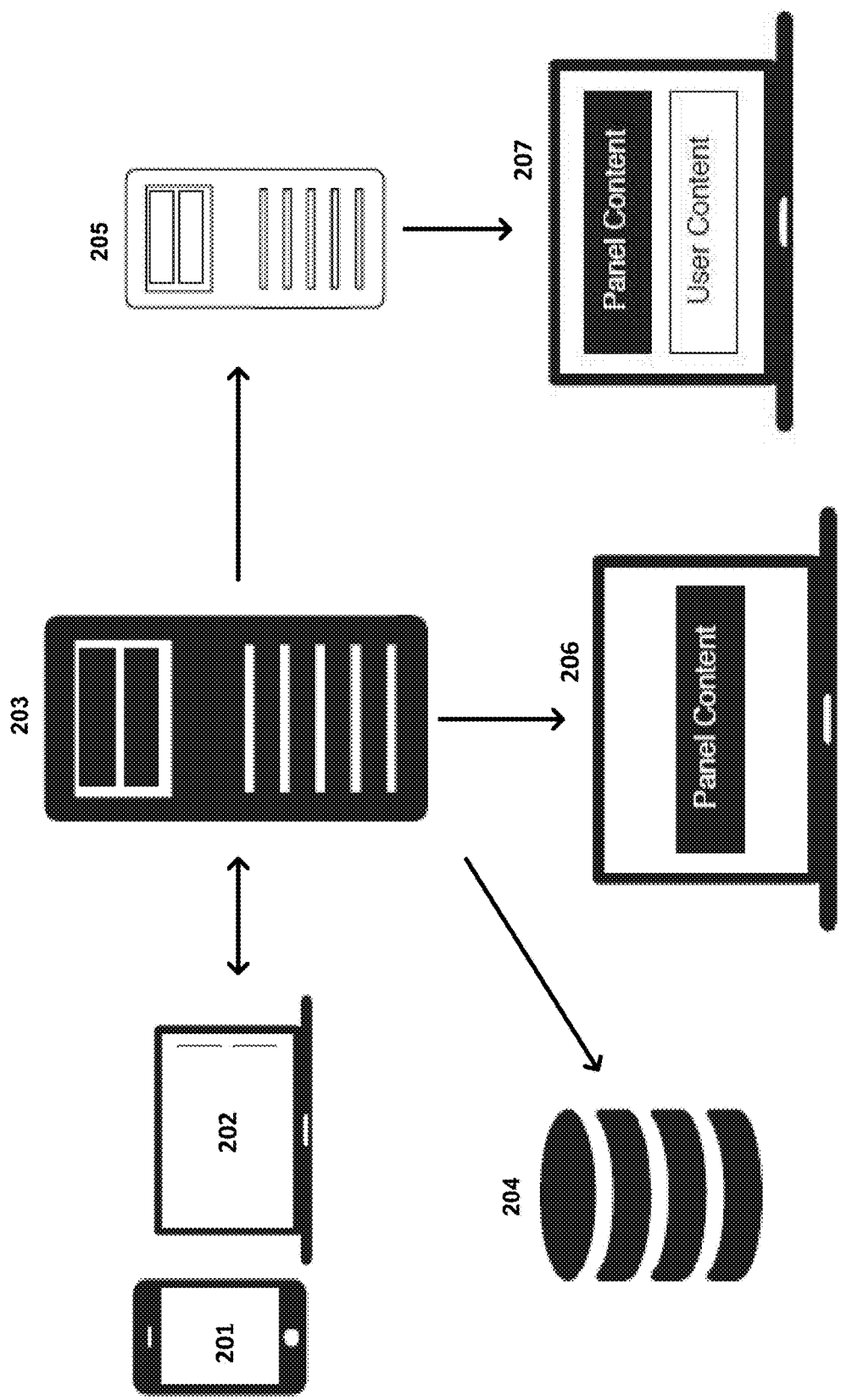
FIG. 2A is a diagram of system architecture for an exemplary embodiment of the claimed system and FIG. 2B is a flowchart showing steps of an exemplary embodiment of obtaining content and data from other existing social media platforms as well as the facilitation of non-curated interactions between individuals on multiple existing social media platforms about, or related to, the curated content and data.

FIG. 2A is a diagram of system architecture for an exemplary embodiment of the claimed system comprising mobile or desktop computing devices 201, 202, 206, and 207, a database 204, application server 203, and social media platform server 205. Authenticated users using a mobile or desktop computing device 201 or 202 can submit content or request publication of content to an application server 203 via a request method supported by HTTP protocol. The content is then sent using JavaScript Object Notation or any other format that uses well-formed text or binary formats to transmit data objects consisting of attribute-value pairs to a social media application programming interface ("API") of social media platform server 205 using OAuth or any protocol that allows secure authorization, and saved to database 204. The user role is queried in the database 204 and if the user is using a moderator or panelist profile or has such assigned authority, then the content is broadcast to mobile or desktop computing devices 206 and 207 using websockets or any other bidirectional protocol supporting communications channels based on the request of the authenticated user. Depending on the authority of the user profile, only the contents of the panel may be available for viewing on computing device 206, or the entire curated interaction, including the panel content and user content may be viewed on computing device 207 or published or subject to further data analytics on computing devices 201, 202, or 207.

Figure 2B:
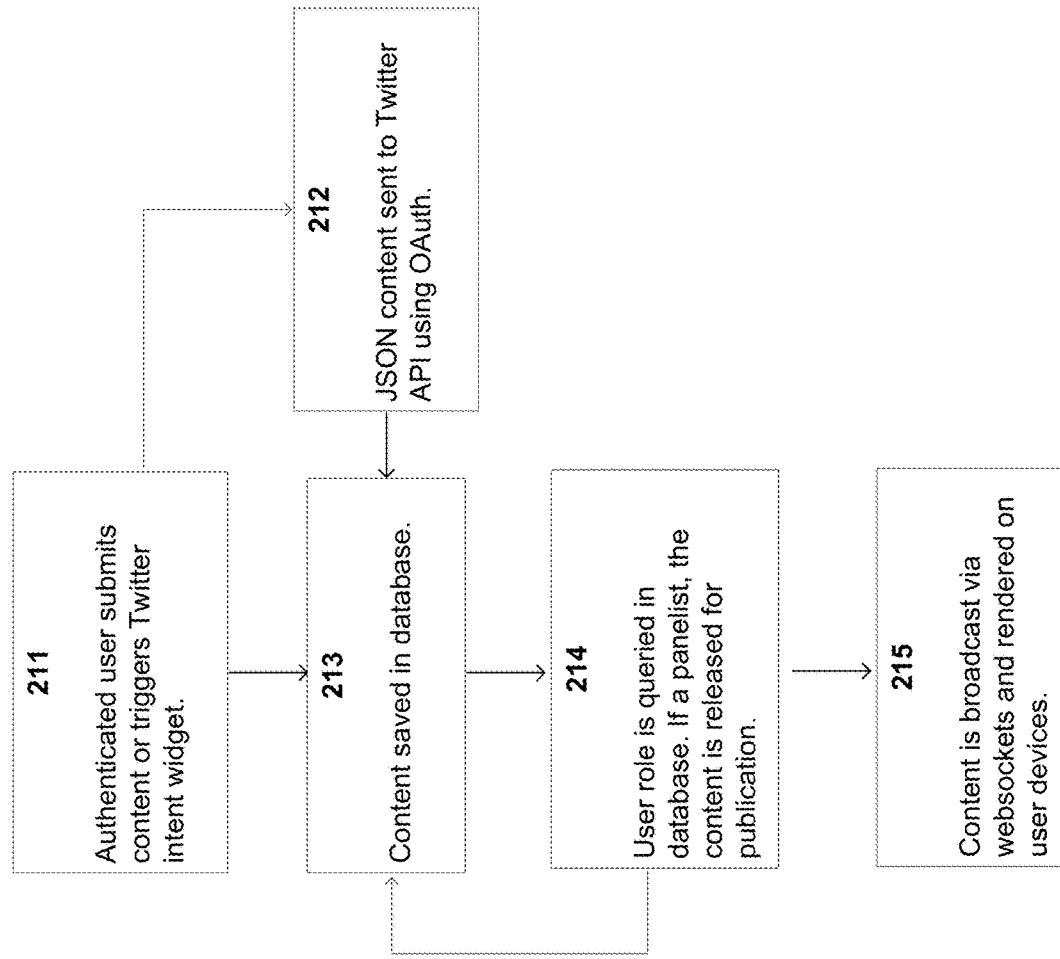

FIG. 2B is a flowchart showing steps of an exemplary embodiment of receiving content and data from other existing social media platforms as well as the facilitation of non-curated interactions between individuals on multiple existing social media platforms about, or related to, the curated content and data. In step 211, authenticated users, using mobile or desktop computing devices, submit content or request publication of content to an application server via their user profiles using a request method supported by HTTP protocol. In step 212, the content is then sent using JavaScript Object Notation or any other format to a Twitter API using OAuth or any protocol that allows secure authorization, and saved to database in step 213. The user role is queried in the database in step 214 and if the user is using a moderator or panelist profile or has such assigned authority, then the appropriate content is released for publication. In step 215, the appropriate content is broadcast to mobile or desktop computing devices using websockets or any other bidirectional protocol supporting communications channels based on the role of the authenticated user in step 211. The systems and methods disclosed herein can function as an audience crowdsourcing engine from the various social media platforms.

Figure 3A:
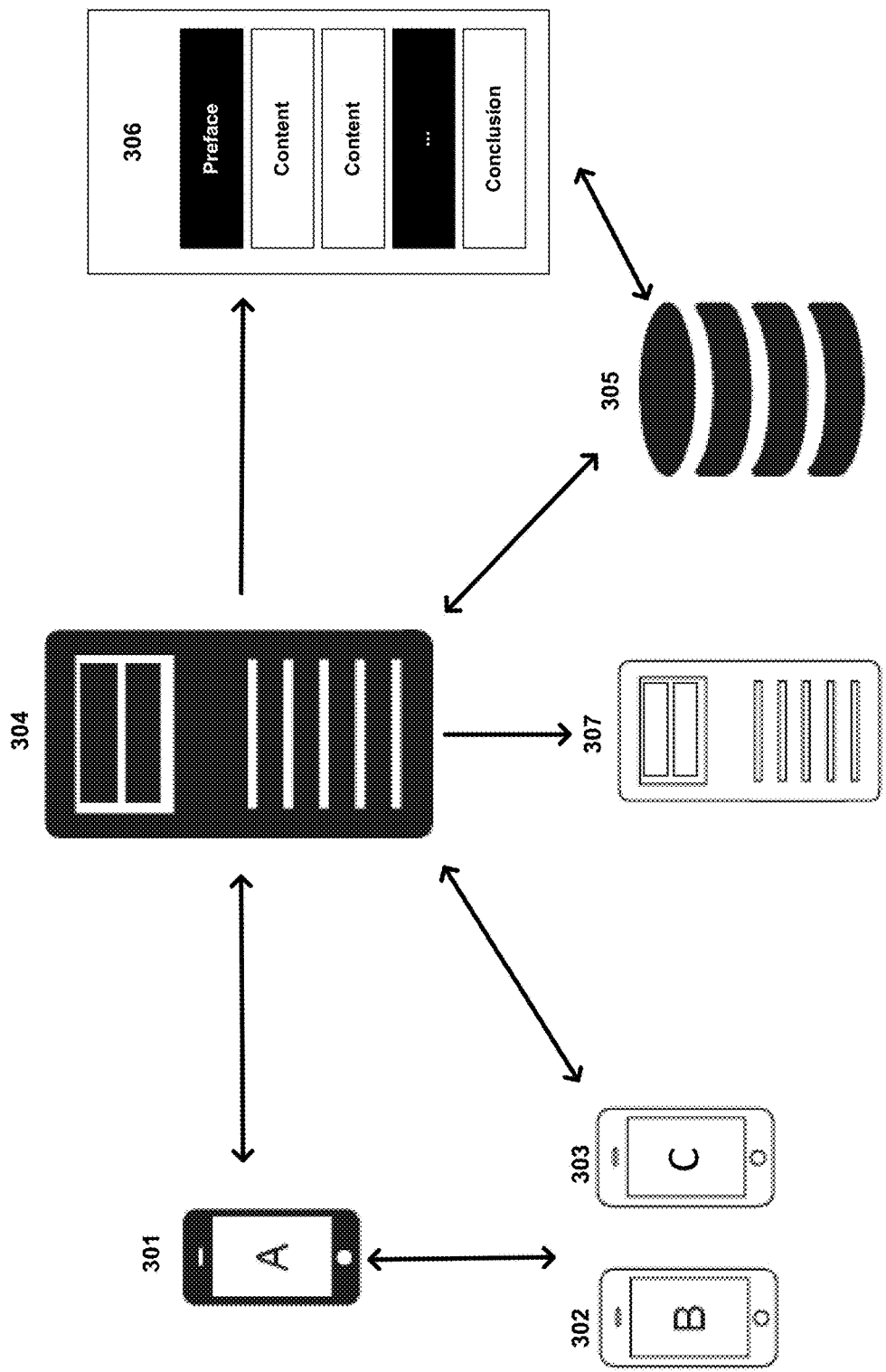
FIG. 3A is a diagram of system architecture for an exemplary embodiment of the claimed system and FIG. 3B is a flowchart showing steps of an exemplary embodiment of assigning roles to specific social media handles or identities for the purpose of facilitating specific, curated interactions among the social media handles or identities.

FIG. 3A is a diagram of system architecture for another exemplary embodiment of the claimed system comprising mobile or desktop computing devices 301, 302, 303 and 306, application server 304, a database 305, and social media platform server 307. A participant using mobile device 301 initiates the curated interaction such as a conversation or a debate and assigns status to participant profiles of computing devices 302 and 303 as panelists, and content via the panelist profiles is submitted and authenticated based on the assigned roles. Using the moderator profile on device 301, that user can start and end the curated content created by the panelists using their profiles on their devices 302 and 303. Authenticated users using a mobile or desktop computing device 301, 302, and 303 can submit content to an application server 304 via a request method supported by HTTP protocol after the moderator has started the curated event but before the moderator has ended the curated event. The content is then sent using JavaScript Object Notation or any other format that uses well-formed text or binary formats to transmit data objects consisting of attribute-value pairs to a social media API of social media platform server 307 using OAuth or any protocol that allows secure authorization, and saved to database 305. The curated content is then broadcast to computing devices of viewers, such as 306 using websockets or any other bidirectional protocol supporting communications channels. In this embodiment, the curated content from the moderator and panelist profiles from computing devices 301, 302, and 303 are juxtaposed in a dialogue, interview, or debate format rather than individual, concatenated feeds and also contain a clearly demarcated beginning and end.

Figure 3B:
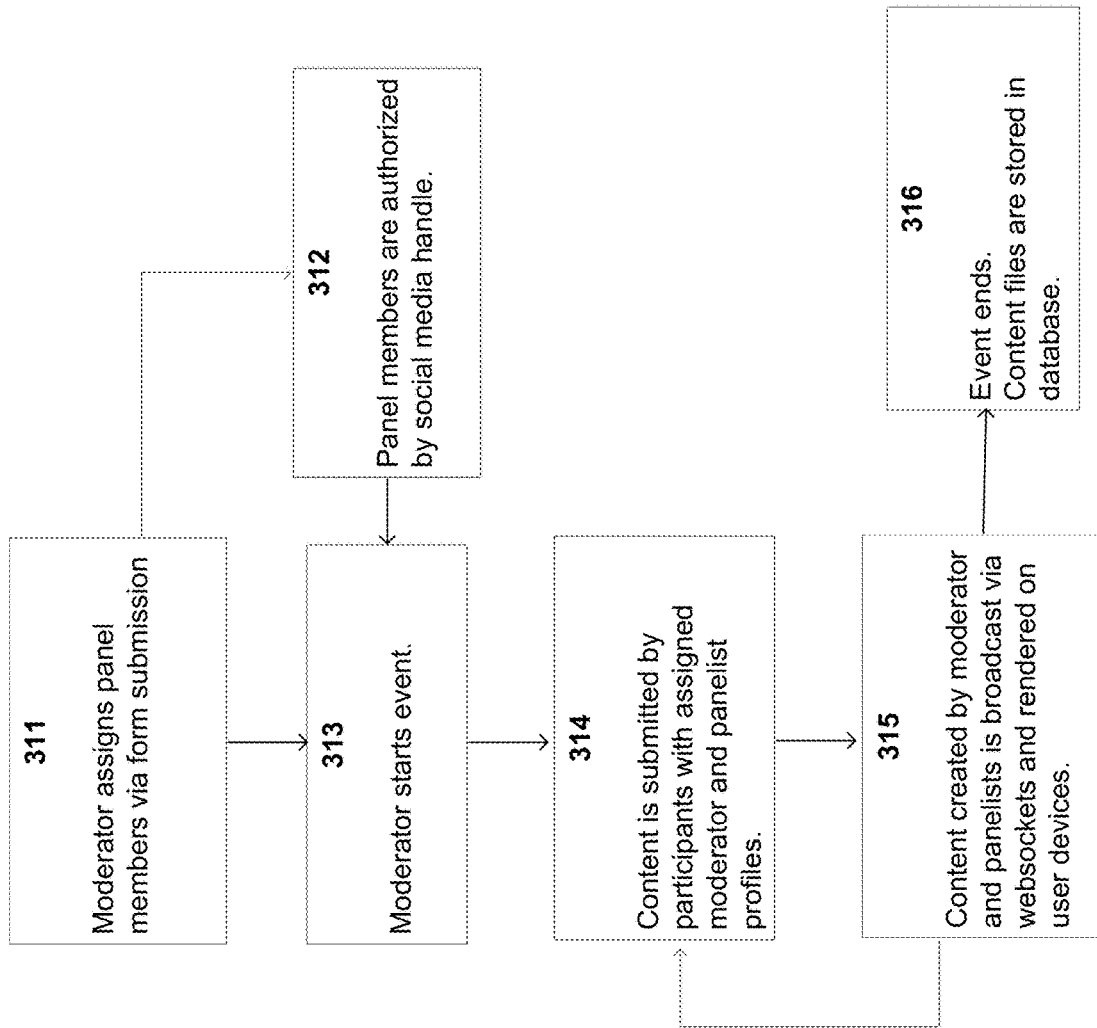

FIG. 3B is a flowchart showing steps of an exemplary embodiment of submitting curated content and data between individuals on one or multiple existing social media platforms about, or related to, the curated content and data. In step 311, a moderator assigns status to individual profiles as panelists, and content via the panelist profiles is submitted and authenticated based on the assigned roles. In step 312, the panelist profiles are authorized by the social media handle. In step 313, the moderator starts the curated event and initiates the submission of content via panelist profiles and in some instances through other user profiles. In step 314, certain authenticated users, including users with the moderator and panelist profiles, using a mobile or desktop computing device can submit content to the application server via a request method supported by HTTP protocol after the moderator has started but before the moderator has ended the curated content. The content is then sent using JavaScript Object Notation or any other format that uses well-formed text or binary formats to transmit data objects consisting of attribute-value pairs to a social media API using OAuth or any protocol that allows secure authorization, and saved to database. In step 315, the curated content is also broadcast to mobile or desktop computing device using websockets or any other bidirectional protocol supporting communications channels. In this embodiment, the curated content from the moderator and panelist profiles from computing devices are juxtaposed in a dialogue, interview, or debate format rather than individual, concatenated feeds and also contain a clearly demarcated beginning and end. In step 316, once the event ends or the session is closed by the moderator, the content files generated during the curated event including the final format of the broadcasted content is stored in the database, and made available for future searches, extraction, publication, and other use.

Figure 4B:
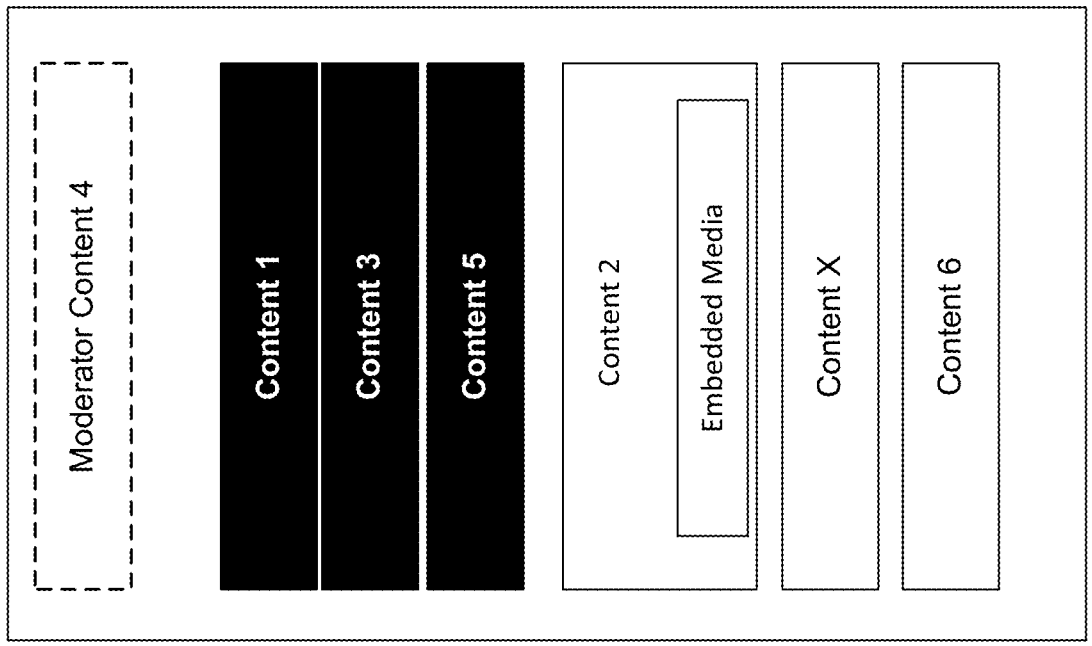
FIG. 4B is an illustration of a format in the art.
Figure 4A:
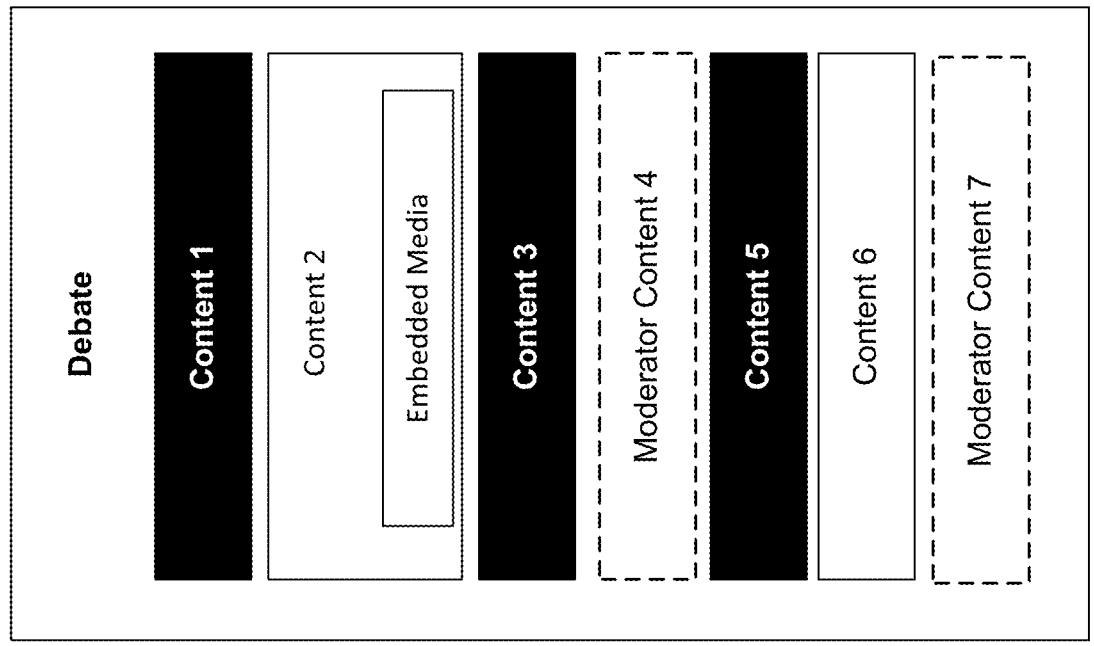
FIG. 4A is an illustration of a format of curated content presented on a graphical user interface, according to an exemplary embodiment.

FIG. 4A is an illustration of a format of curated content presented on a graphical user interface, according to an exemplary embodiment as compared to a format in the art shown in FIG. 4B. Certain embodiments of the methods and systems disclosed herein present curated content in the format shown in FIG. 4A on a graphical user interface, wherein content submitted by the moderator (e.g. Moderator Content 4 and Moderator Content 7), a first panelist via his panelist profile (e.g. Content 1, Content 3, and Content 5), and a second panelist via her social handle (e.g. Content 2 with embedded video or audio content and Content 6) are juxtaposed into a dialogue, interview or debate format. In contrast, content in social media platforms is not organized and is presented as individual, concatenated feeds in the format shown in FIG. 4B, and can also include content unrelated to the discussion at hand, e.g. Content X.

Figure 5:
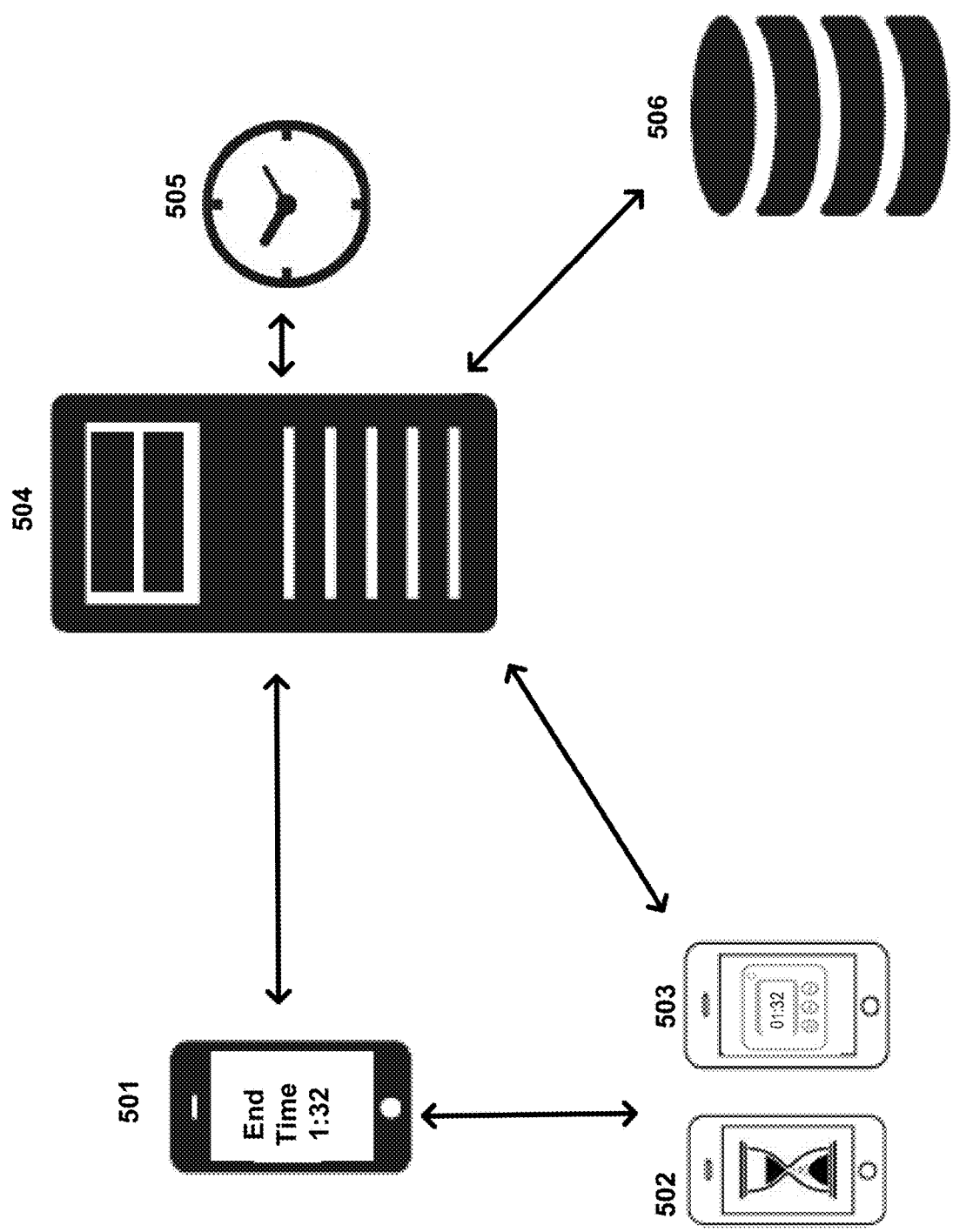
FIG. 5 is a diagram of the system architecture, according to an exemplary embodiment for permitting time demarcation for interactions between social media handles and data points, and management of user engagement with time demarcated interactions.

FIG. 5 is a diagram of system architecture for another exemplary embodiment of the claimed system comprising mobile or desktop computing devices 501, 502, and 503, application server 504 with a programmable event timer 505, and a database 506 and implementing an exemplary embodiment of permitting time demarcation for interactions between social media handles and data points, and management of user engagement with time demarcated interactions. A moderator using a mobile or desktop computing device 501 can either schedule an automatic start and stop time for a curated interaction using a programmable event timer 505 on the application server 504, or manually start or stop a curated interaction by submitting an order to application server 504. These graphical user interfaces presented on computing devices 501, 502, and 503, can also present timers to the beginning or end of any dialogue, interview or debate event, and these timers can count up or down, with or without a visual or sound alarm, in a loop or not, and in various colors, sizes and fonts. The curated event is automatically archived to a database 506 after a pre-determined amount of time, or at the end of the end in the curated format, along with all related data and metadata.

Figure 6:
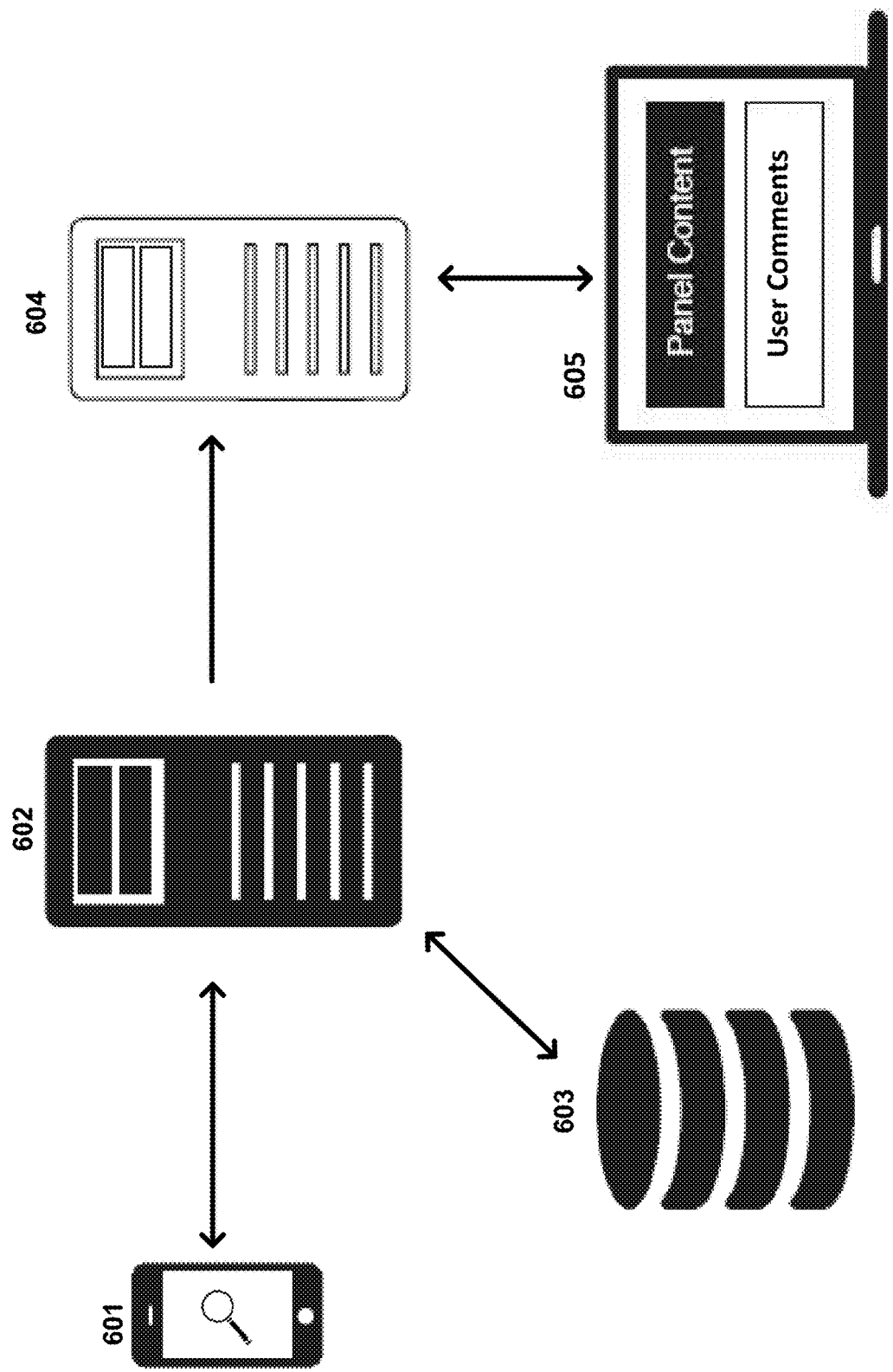
FIG. 6 is a diagram of the system architecture, according to an exemplary embodiment for interactions, including time-demarcated interactions, to be archived and cataloged in any searchable database.

FIG. 6 is a diagram of system architecture for another exemplary embodiment of the claimed system comprising mobile or desktop computing devices 601 and 605, application server 602, a database 603, and social media platform server 604 and performing steps of an exemplary embodiment of permitting curated interactions, including time-demarcated interactions, to be archived, cataloged, and retrieved, in part or in whole, in a searchable database. An individual or an entity with authenticated credentials or a registered participant profile and using a mobile or desktop computing device 601 can search archives of curated interactions by submitting a request to an application server 602, which then queries and extracts the curated content from database 603. The curated content archives can be categorized for semantic search. FIG. 6 shows an embodiment in which engagement with archived content is not included directly from the application server 602 instead non participant users can engage with archived debates via content accessed from social media platform server 604. Other embodiments can include direct engagement with archived content from the application server 602.

Figure 7:
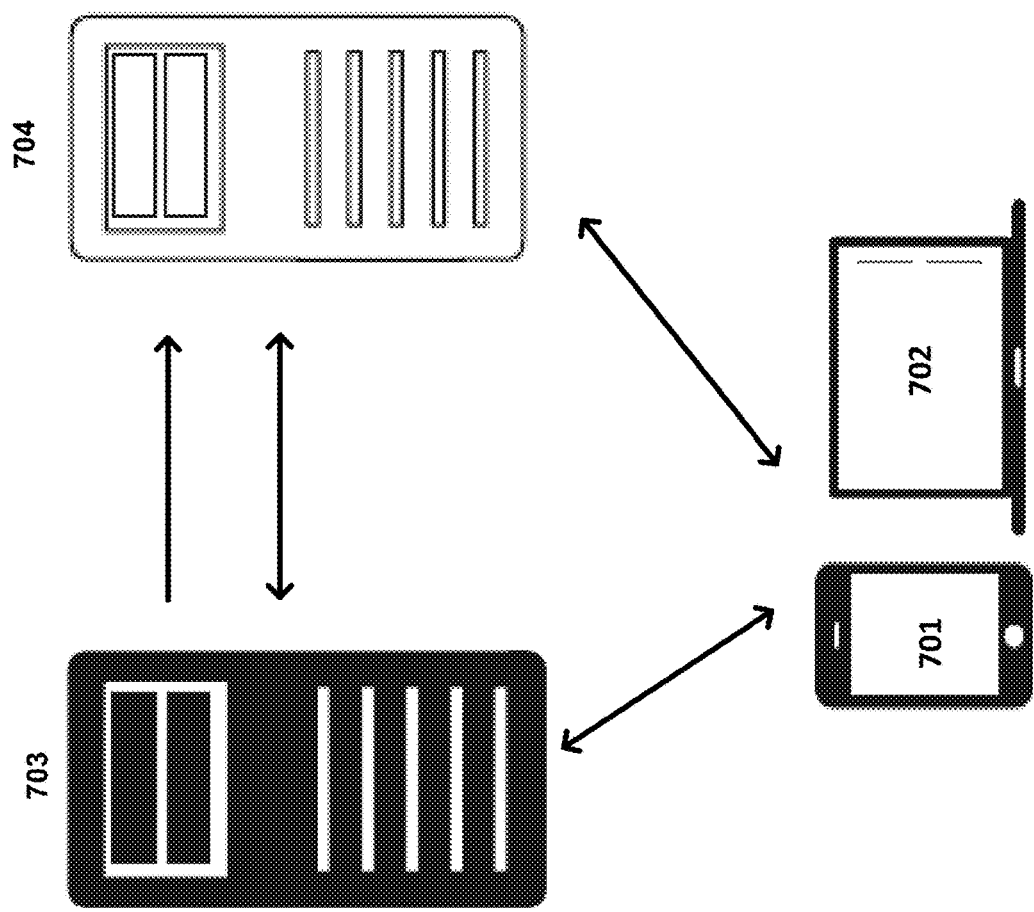
FIG. 7 is a diagram of system architecture, according to an exemplary embodiment for individual interactions and data points to be retransmitted or republished in the same platform, including a social medial platform, or in one or more other platforms, and to be included within a curated interaction, and tracking and managing content or data points that are retransmitted or republished by an individual participating in multiple curated interactions so that the content or data points are associated with the correct curated interaction.

FIG. 7 is a diagram of system architecture for another exemplary embodiment of the claimed system comprising mobile or desktop computing devices 701 and 702, application server 703, and social media platform server 704 and performing steps of an exemplary embodiment of permitting individual interactions and data points to be retransmitted or republished in the same platform, including a social medial platform, or in one or more other platforms. In this embodiment, individual interactions can be included within a curated interaction, and can be retransmitted or republished by an individual participating in multiple curated interactions so that the content or data points are associated with the correct curated interaction. Individual interactions and curated content can be tracked and managed by the application server 703 alone or in combination with the social media platform server 704. For example, the application server 703 publishes tweets on behalf of participant profiles that are using computing devices 701 and 702, and saves the tweet id. The application server 703 is configured to subscribe to the user stream of each participant, filtering relevant retweets by tweet id. Individuals using computing devices 701 and 702 can submit content to the application server 703 via a request method supported by HTTP protocol after the moderator has started but before the moderator has ended the curated content. The content is then sent using JavaScript Object Notation or any other format that uses well-formed text or binary formats to transmit data objects consisting of attribute-value pairs to a social media API using OAuth or any protocol that allows secure authorization. The curated content can then be re-published using the same application server or the social media platform server 704, filtering relevant re-publications by the identification of the original submitter of the content.

Figure 8:
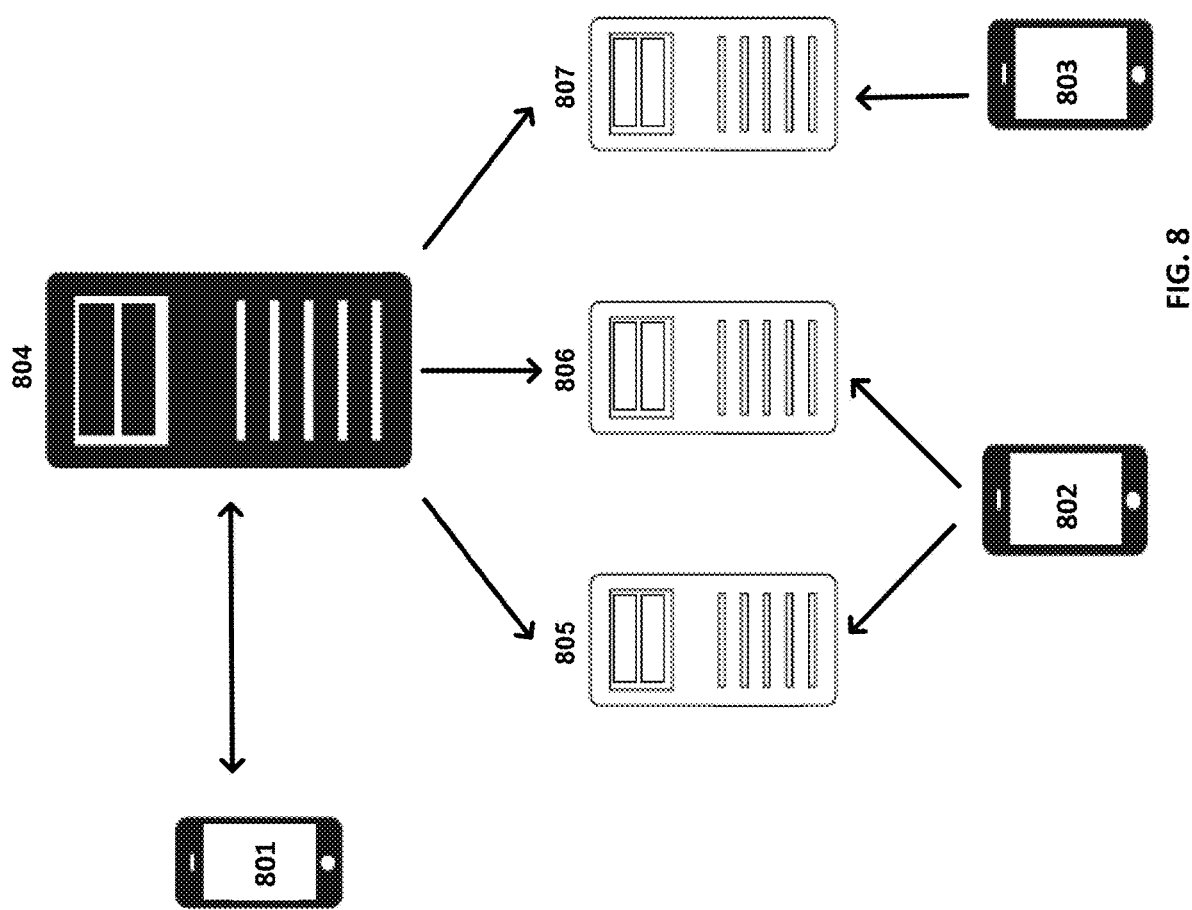
FIG. 8 is a diagram of system architecture, according to an exemplary embodiment for any participant in a curated interaction to publish content or data points simultaneously from any platform, including a social media platform, across multiple platforms, including social media platforms, so that participants or observers can view or interact with content or data points using the platform of their choice regardless of the platform used by other participants or observers.

FIG. 8 is a diagram of system architecture for another exemplary embodiment of the claimed system comprising mobile or desktop computing devices 801, 802, and 803, application server 804, and social media platform servers 805, 806, and 807, and performing steps of permitting any participant in a curated interaction to publish content or data points simultaneously from any platform, including a social media platform, across multiple platforms, including social media platforms, so that participants or observers can view or interact with content or data points using the platform of their choice regardless of the platform used by other participants or observers. Authenticated users using mobile or desktop computing devices 801, 802, and 803 can submit content to an application server 804 via a request method supported by HTTP protocol using the application server 804 itself or through one or more of social media platform servers 805, 806, and 807 of the authenticated user's choice. The submitted content is then published to application server 804, and one or more social media platform servers 805, 806, and 807 as specified by the authenticated participant. Thus, in this embodiment, participants connect to their favorite social media platform, and can toggle between the various interfaces to contribute in the desired format, for example, Instagram, Vine, or Twitter.

Figure 9:
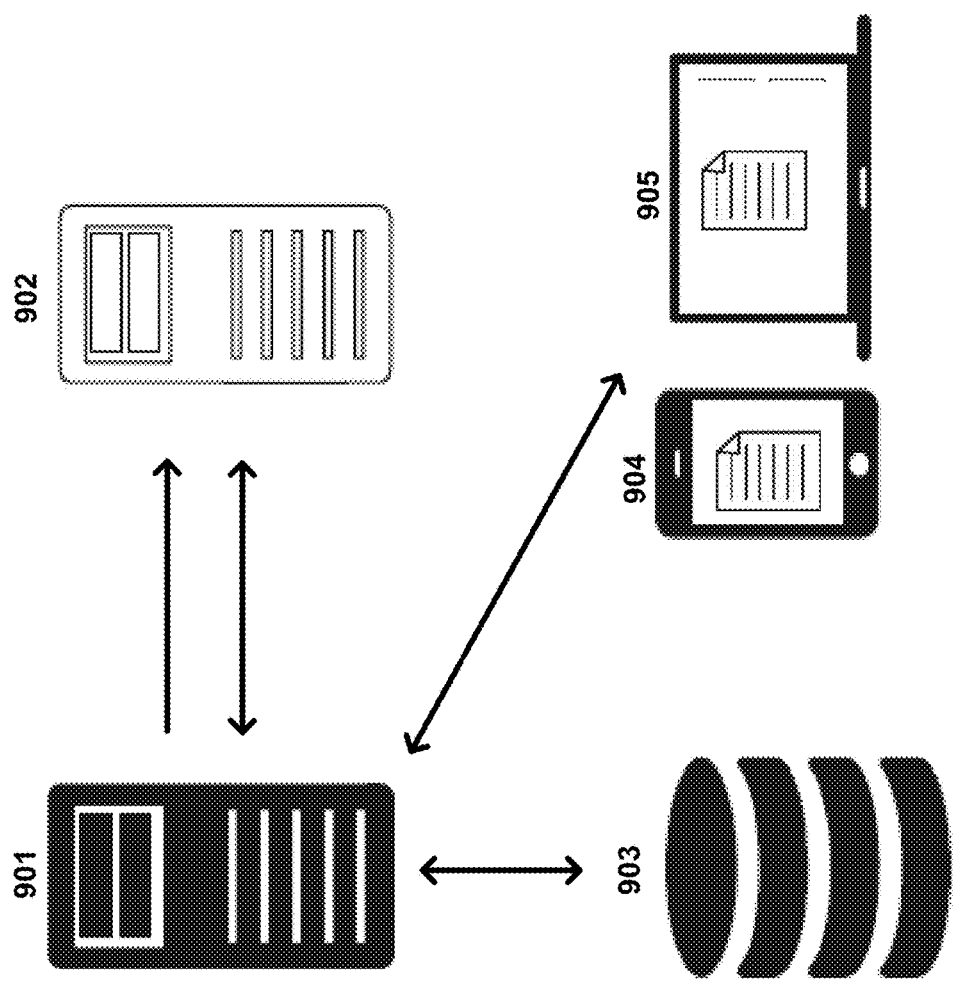
FIG. 9 is a diagram of system architecture, according to an exemplary embodiment for any participant or observer to provide feedback regarding curated content or data points, or regarding participants or observers, in a curated interaction, as well as the analysis and publication of the feedback to some or all participants and observers.

FIG. 9 is a diagram of system architecture for another exemplary embodiment of the system comprising application server 901, social media platform server 902, database 903, and one or more mobile or desktop computing devices 904 and 905, and performing steps of permitting any participant or observer to provide feedback regarding curated content or data points, or regarding participants or observers, in a curated interaction, as well as the analysis and publication of the feedback to some or all participants and observers. The application server 901 can publish a request for feedback to all individuals participating or observing curated content to social media platform server 902. The individuals participating or observing curated content can provide the requested feedback to application server 901. Once the predetermined time for the feedback to be provided has ended, a results document is created by application server 901 based on and in response to content posted to application server 902 as identified by the request for feedback and tracking of participants and observers of the curated content and stored on the database 903. For example, application server 901 sends a message to each participant profile to ask about the winning handle. Application server 901 subscribes to the social media site stream for finite time period, saving winning handles to database. A results document is created by application server 901 and presented on the computing devices 904 and 905 either through customized GUIs or other social media interfaces.

Figure 10:
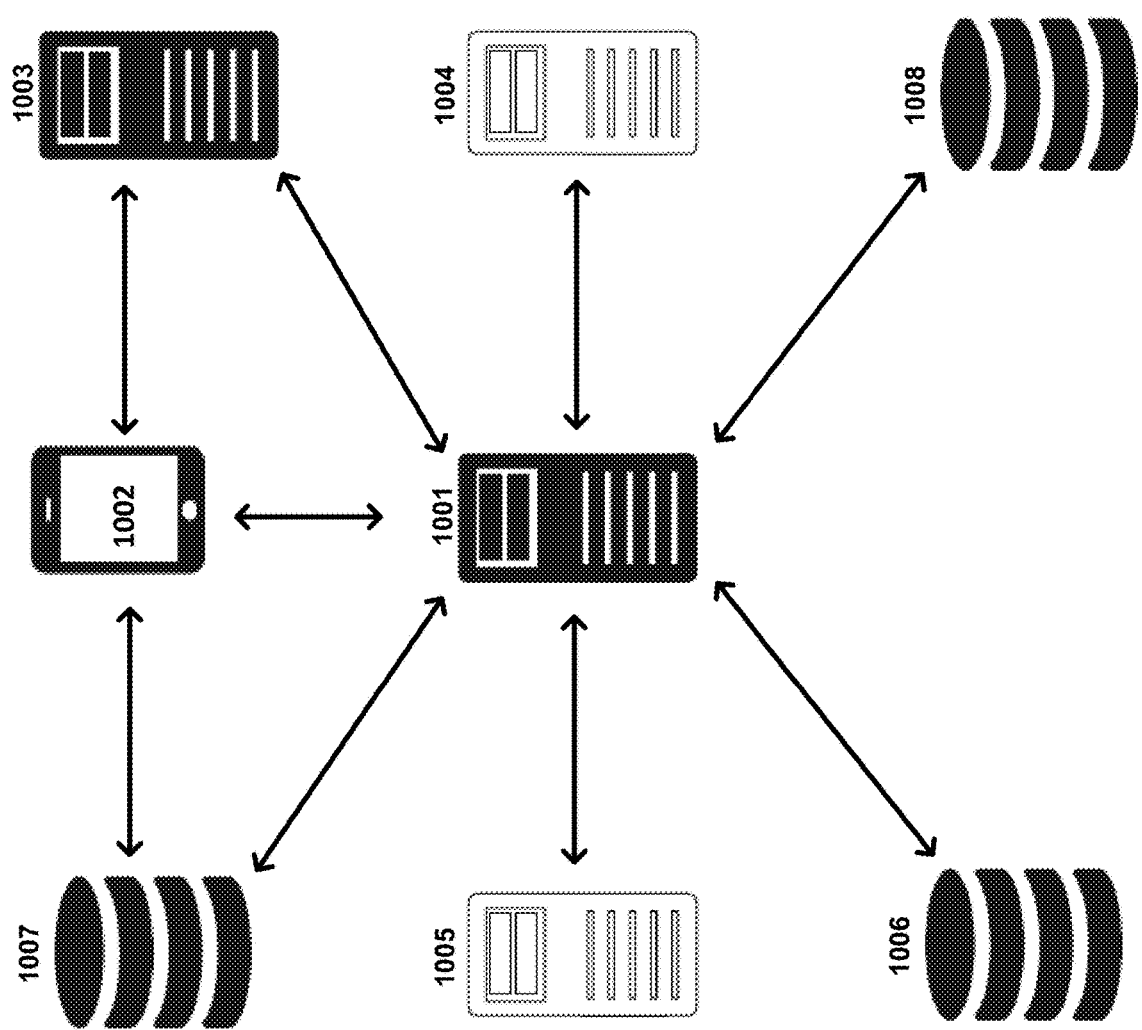
FIG. 10 is a diagram of system architecture, according to an exemplary embodiment that includes multiple types of databases and application servers.

An example of an embodiment of the system is illustrated in FIG. 10 and described in detail below. The system architecture claimed system includes an API on an application server 1001, one or more mobile or desktop computing devices 1002; a static file server 1003 such as Netlify; a real-time data server 1004 such as Firebase; a social media platform server 1005, such as Twitter; a SQL database 1006, such as PostgreSQL; a dynamic file store 1007, such as Amazon S3; and a cache/job queue database 1008, such as Redis. Authentication of the users or participants is carried out by a graphical user interface on the computing device 1002, static file server 1003, and a real-time data server 1004. Static files from Netlify are communicated to and from a graphical user interface on the computing device 1002 via HTTPS or similar protocol. The OAuth protocol is used to securely authenticate the user. Using a computing device, the user navigates to a specific website in web browser, which issues a GET request with Accept header text/html. Amazon Route53 has a CNAME record which resolves to the production Netlify environment subdomain. Netlify router matches route rules to send the index html page to the browser client. Netlify serves additional assets in parallel that the browser requests. The browser establishes encrypted web socket connection with Firebase, and the JavaScript application listens for authentication changes. The user clicks "sign in" button on the user interface, which triggers a click event in the browser, and the handler is configured to open another browser window to enable Twitter OAuth without a full page redirect via communication with the Twitter server 1005. The method then includes the user authorizing the application software in a Twitter popup window, and directing Firebase 1004 to close the window, thus triggering an authentication change event with credentials. The client application program then sends Twitter credentials from Firebase to the server application program. The server application program verifies credentials using the Twitter API then either creates or updates the database. The server application program queries database for authorization grants, and returns a session to the client application program. The client application program updates visually to indicate authentication.

Root authorization is done by hard-coding administrator Twitter accounts. All other authorization is done by typing in a Twitter nickname to grant a role. Authorizations may be granted to any public Twitter account, even before they sign in to the platform on application server 1001. The user navigates to page with a form containing text input for a Twitter nickname. The client app captures keyup events, and sends each value to the server application program. The server application program checks database for Twitter nickname, and if there is no matching record, pulls the profile using the Twitter API and caches the result in the database 1006 or 1008. When the user submits the form to send a server request to store authorization grant in database for the specified Twitter account, the server application program pushes authorization grants to Firebase 1004.

Users, whose profiles have been assigned administrator roles, create panels and assign roles such as panelist or viewer for individual participant profiles for specific events. The administrator profile page is presented with selection buttons to "Manage" events and then "Create Panel." The client application program then sends a request to the application server 1001 to create a new curated interaction interface and this information is stored in the database. Using choices presented on the administrator profile page, the user can authorize panel roles such as "moderator" or "member" designations for individual participant profiles. The application server pushes authorizations to Firebase. The user device is presented with more parameters to define the curated interaction such as "introduction" and "start time," and these selections are sent to the application server 1001 to store in the database. The application server 1001 responds with the status of the curated interaction and its participant profiles. When the curated interaction is "ready to publish," the user clicks the "Publish" button on the interface on the computing device. This selection is communicated to the application server 1001 and also stored in the database. The application server 1001 also communicates this information about the curated interaction to Firebase 1004. Viewers and other participants, who navigate to the published panel page, can see the introduction and the countdown timer until the "start time" for the curated interaction, and download an ICAL calendar event. The client application program checks system clock and compares to "start time" on each tick. Once the event starts, the countdown and calendar invite are removed, and the client application program checks authorization grants with Firebase.

Figure 11:
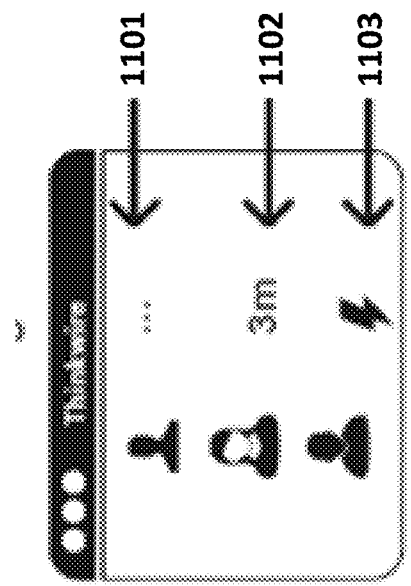
FIG. 11 is an illustration of a presence panel appearing on a user-interface, according to an exemplary embodiment.

Each authorized user is rendered in a sidebar, which includes a presence system per panel, as shown in FIG. 11. FIG. 11 is an illustration of a presence panel, according to an exemplary embodiment. Client subscribes to updates from Firebase presence collection for presence changes. For each user, the client renders either a repeating animation 1101 (user is typing), an icon 1103 (user is present on page), a time ago timestamp 1102 (user no longer on page), nothing (user has never been to page). Client for authorized user triggers a presence update for Firebase on page load, and also each keyup event on the text area input. Client for authorized user sends a preemptive disconnect command to update presence so if the connection drops the presence system is updated properly. Firebase security rules prevent users from updating another user's presence values.

Authorized users can create content. Participant submits content form with text area and uploads the file input, or participant sends multi-part POST request to the server application program 1001. The server application program creates content in database 1006 and also stores files to Amazon S3 1007, if multipart. The server application program queues jobs and background tasks in Redis 1008 to send the post to Twitter. The server application program queues job to push data to Firebase 1004. Worker process performs jobs with very short latency. Participant subscribes to Firebase collection events to render new posts, re-render updated posts, and remove deleted posts. The user interface on the computing device 1002 is configured to present an audio or visual cue upon each new post event. Unauthorized users can interact with Twitter intents to favorite and reply on Twitter through a popup window. Authorized moderators can delete inappropriate posts, and the DOM elements will be removed from every client device.

At some point a panel reaches a natural conclusion, at which point the owner ends the panel. User (panel owner) clicks "End Panel" button in manager dashboard, Participant sends request to the server application program which pushes the event to Firebase. Each Participant subscribes to the Firebase panel path, and once the panel has ended, the event triggers a view render to remove content creation form and presence system. User (panel owner) types in conclusion and clicks check boxes to add search tags. Each published panel is available on each participant profile, including the moderator, sponsor, and viewer's personal profile, as well as optionally featured panelists and other viewers based on category.

Graphical user interfaces include one or more displays presented on a computing device that enable user interaction with the server application program or other devices engaged with the server application program and other content providers in the system, associated data acquisition, and other processing functionalities. These interfaces can be implemented within an operating system, a discrete GUI software layer, an application program, or any combination thereof. One or more participant-side and server-side technologies or combinations thereof can be implemented to ensure that the graphical user interfaces are dynamically generated based on the updates to the records in the databases associated with the application server or social media platforms, both of which are communicatively coupled to the server application program. Content for personalized web-based or an app-based interfaces can be dynamically generated on participant devices, based on updates to the database and plurality of inputs from the content providers. Data communicated between the various devices, servers, and other components of the system is encrypted, stored, decrypted, and distributed using one or more firewalls, and/or file encryption protocols, and other encryption software.

The application program used by the participants to access the system can include one requiring proper credentials, and graphical user interfaces that present, collect, and communicate information between the client and the company offering the application program. The credentials can include alphanumeric strings (either case-sensitive or not), symbols, such as punctuations and mathematical symbols, images, and all combinations thereof. In certain embodiments, this application program on the participant's device permits that participant to interact with the system across platforms, browsers, and between social media platforms.

Figure 12:
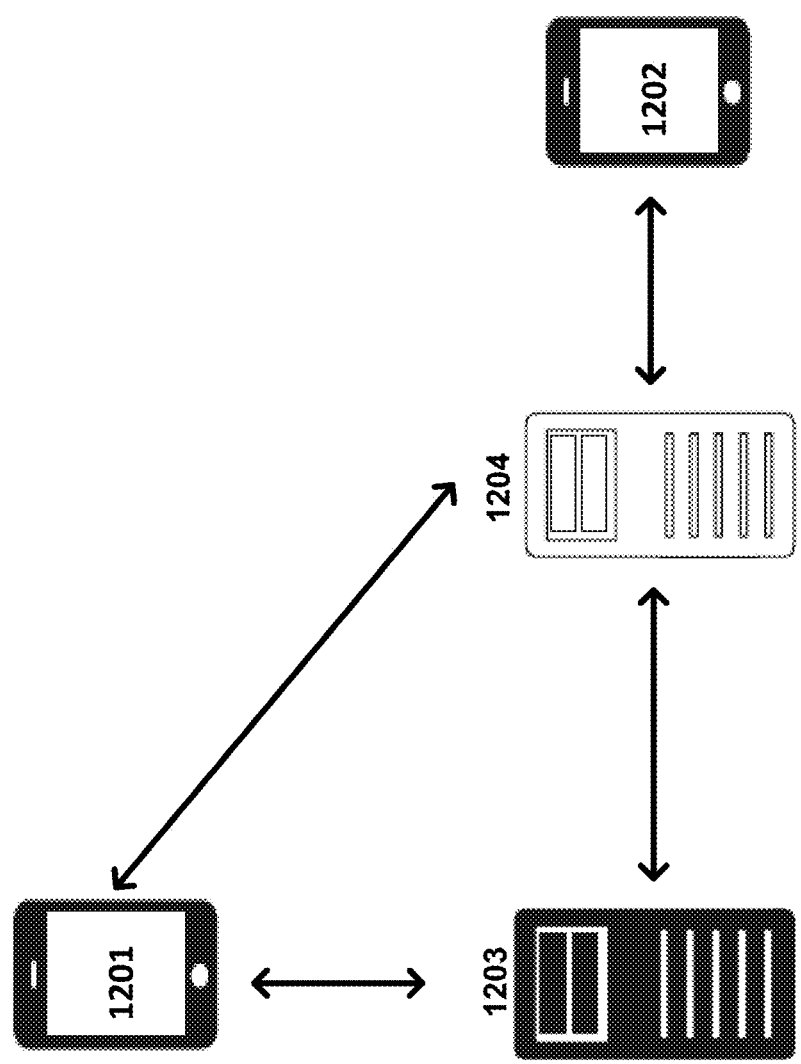
FIG. 12 is a diagram of system architecture, according to an exemplary embodiment that includes multiple participant devices.

An exemplary embodiment of the system is illustrated in FIG. 12 and described in detail below. The system includes mobile or desktop computing devices 1201 and 1202, application server 1203, and social media platform server 1205 and is capable of performing steps of permitting two or more participants in a curated interaction to publish content or data points from multiple platforms. For example, a participant using computing device 1201 requests authentication by the server application program by submitting his credentials. These credentials can be unique to the server application program or be the same as the user uses for another social media platform. The same participant can access the server application program on the application server 1203 by submitting his credentials on an interface presented by the social media platform server 1204. The server application program is communicatively coupled to any social media platform, and can draw content authorized by the participant. Upon receipt of participant credentials, the server application program creates a secure session for the participant to either initiate an event or transmit content to an event in progress. Another participant using computing device 1202 participates in the same event as the participant using computing device 1201 but all his interaction is mediated by his preferred social media platform server 1204. Although this content from computing device 1202 is served in a different format than the content received from computing device 1201, the server application program obtains the different content and publishes the content in a curated format according to the rules associated with the event.

The application program can present a landing graphical user interface or an introductory interface on a participant device where a participant is introduced to the application program, a specific event, or a list of prior and pending events, list of events in progress, or combinations of this information. The application program permits a user to search the database by past, current, and future events or participants or topics or combinations thereof. For example, user interfaces can provide search options to a viewer to search past, in-progress, and future events for particular content providers of interest and results of such searches can be displayed in rank order that match a search request from the user.

Figure 13:
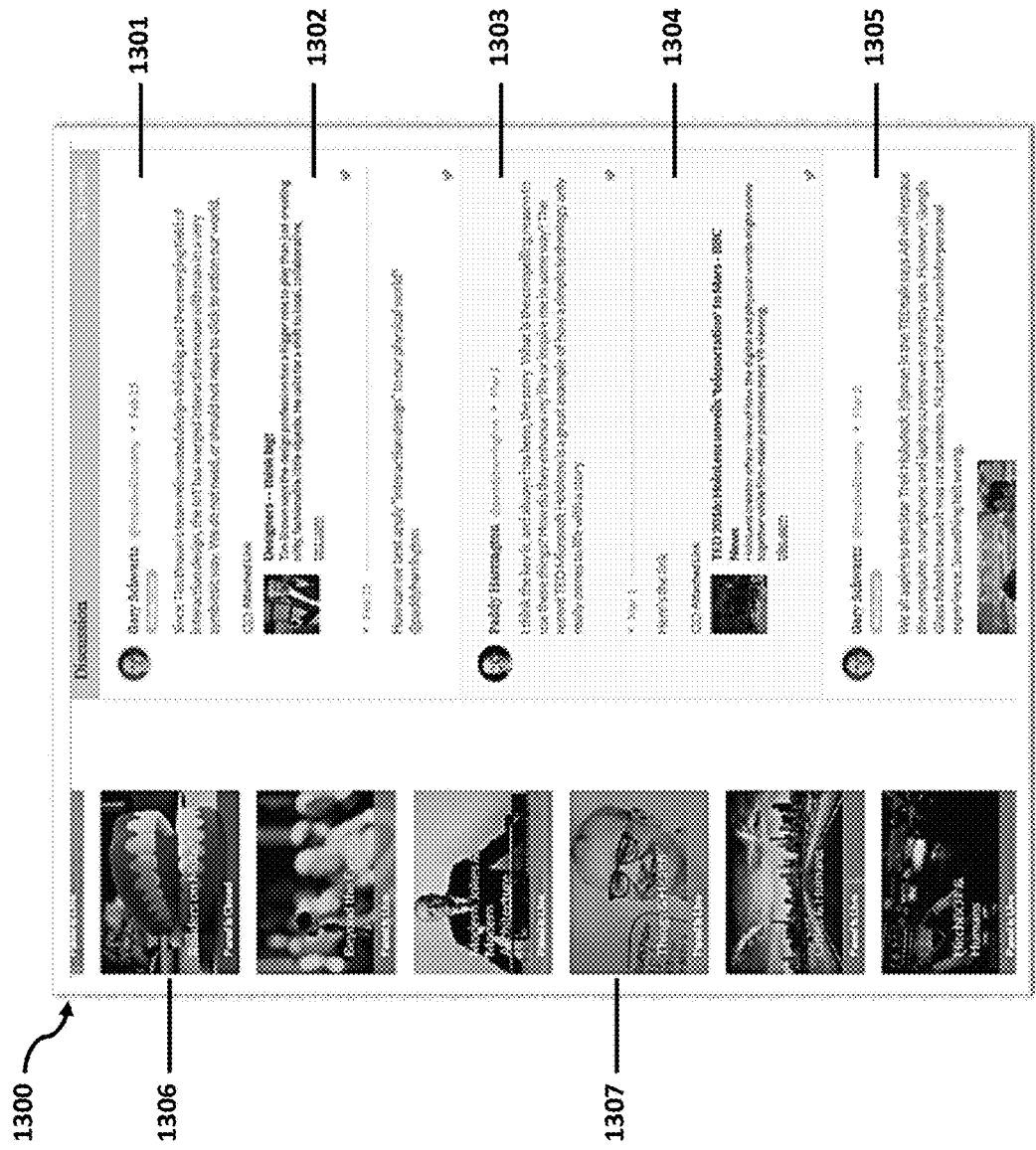
FIG. 13 is an exemplary illustration of a user interface on one or more computing devices, according to an embodiment.

FIG. 13 is an exemplary illustration of a graphical user interface of the application program implementing certain aspects of the processes described in previous embodiments. FIG. 13 shows a graphical user interface 1300 presented at one or more of participant devices that includes a curated discussion between two participants. The first participant is identified as the moderator as shown in section 1301 of the interface. Along with the introductory content published in section 1301, this participant has provided additional content as shown in section 1302—a link to relevant multimedia content available at an external resource, such as at ted.com and a question directed to a particular content provider with a specific identifier "@paddyharrington." This particular content provider has provided responsive content as shown in section 1303 of the interface and additional content available at an external resource, such as at ted.com as shown in section 1304. Content from the moderator in response to the second participant's content is presented as shown in section 1305 of the interface, and this whole interaction is presented to the viewers as a discussion. The GUI also has a ribbon of icons corresponding to previous events, such as icon 1306 that provide the name of the topic and the current status-"Panel is Closed" and icon 1307 that provide the name of the topic "Things & Health" and the current status-"Panel is Live." This series of clickable icons are configured to enable the participant to join an event in progress or view curated content from a previous event.

Figure 14:
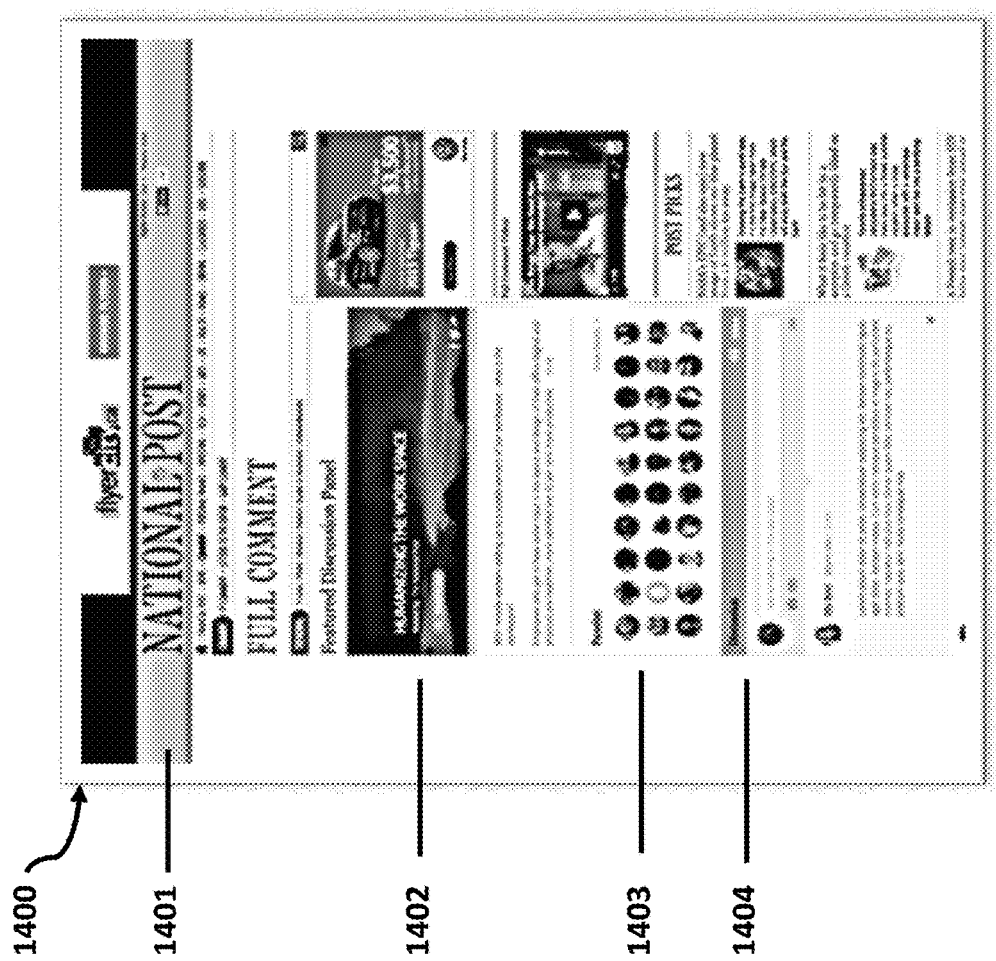
FIG. 14 is an exemplary illustration of a user interface on one or more computing devices, according to an embodiment.

The systems and methods disclosed herein provide a platform for multi author content creation. The contribution from each user through his user profile can be shared to multiple social media destinations. The content creation platform can exist as an independent service or can be embedded into a client's website. FIG. 14 is an exemplary illustration of a graphical user interface of the application program implementing certain aspects of the processes described in previous embodiments. FIG. 14 shows a graphical user interface 1400 presented at one or more of participant devices that includes a curated discussion with multiple panelists accessed and presented at a client or partner site, so as to drive web traffic back to the client's services and products. The graphical user interface 1400 is presented via client site, such as the National Post as identified in section 1401 of the interface. The topic of the event is presented as shown in section 1402 of the interface 1400, which has been developed to look like an article. Instead, the curated discussion can be embedded into the webpage as an iFrame. A group of panelists, identified by their social media picture as shown in section 1403 of the interface, are authorized to post content relevant to the identified topic. The curated format here is a discussion-style composite of individual content from the panelists as shown in section 1404 of the interface. This format can be an interview series with an individual, such as a fireside chat, or panel discussions with influential content providers. This content can be sponsored to drive revenue for the event and have significant value for such sponsors.

Not shown in these exemplary user interfaces are a number of commonly used controls, such as controls that are used to maximize, minimize, resize, and close graphical user interfaces 1300 and 1400. Graphical user interfaces can also include other controls such as scrollbars and navigational controls (not shown). Navigation controls allow a participant to toggle between different graphical user interfaces of the application program and other social media interfaces. The application program can also provide one or more graphical user interfaces with one or more icons, screen layouts, and other visual and verbal cues to present curated content to a viewer, to accept content from a content provider, to enable the moderator or host to curate content in a desired format. Other functionalities can include functionalities to facilitate communication among the various parties involved in curated discussion, such as moderator, panelists, and viewers.

Unless specifically stated otherwise as apparent from the following discussion, it is appreciated that throughout the description, discussions utilizing terms such as "creating," "providing," "calculating," "processing," "computing," "transmitting," "receiving," "determining," "displaying," "identifying," "presenting," "establishing," or the like, can refer to the action and processes of a data processing system, or similar electronic device, that manipulates and transforms data represented as physical (electronic) quantities within the system's registers or memories into other data similarly represented as physical quantities within the system's memories or registers or other such information storage, transmission or display devices. The system can be installed on a mobile device.

The exemplary embodiments can relate to an apparatus for performing one or more of the functions described herein. This apparatus may be specially constructed for the required purposes, or it may comprise a general-purpose computer selectively activated or reconfigured by a computer program stored in the computer. Such a computer program may be stored in a machine (e.g. computer) readable storage medium, such as, but not limited to, any type of disk including solid state drives (SSDs), floppy disks, optical disks, CD-ROMs and magnetic-optical disks, read only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module that may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method to present time-demarcated information, the method comprising:
    generating, by an application server, a session on a social media application for an interaction between a plurality of participant profiles operating a plurality of computing devices, wherein the application server grants access to each participant user in the session upon authenticating each participant user;
    transmitting, by the application server, an event identifier for the session, the event identifier is associated with a plurality of event parameters to each of the plurality of computing devices accessed by the plurality of participant profiles, the event parameters being two or more of event start time, event duration, event end time, and event topic;
    selecting, by the application server, at least two content provider profiles from the plurality of participant profiles;
    receiving, by the application server during the session, and storing in a database a plurality of content files provided by the plurality of computing devices of the at least two content provider profiles in response to the event identifier;
    querying, by the application server, the database to retrieve a plurality of selective information from the plurality of content files conforming to the event parameters;
    transmitting, by the application server, the plurality of selective information and corresponding content provider profile to two or more of the plurality of computing devices executing the social media application to render a user interface presenting each of the plurality of selective information and corresponding content provider profile in a curated format comprising a visibly demarcated beginning and an end; and
    presenting, by the application server, the plurality of selective information in the curated format on the social media application running on a set of computing devices operated by a set of viewer profiles configured to only view the plurality of selective information.

2. The computer-implemented method of claim 1, further comprising:
    transmitting, by the application server, each of the plurality of selective information and the corresponding content provider profile in the curated format to a social media platform server through a secure communication protocol.

3. The computer-implemented method of claim 1, wherein the application server receives the plurality of content files from the plurality of content provider profiles only during a time interval associated with the event identifier.

4. The computer-implemented method of claim 1, further comprising:
    updating, by the application server, the interface associated with the event identifier on one or more of the plurality of computing devices to present each of the plurality of selective information and the corresponding content provider profile in real-time.

5. The computer-implemented method of claim 1, wherein the curated format is a juxtaposition of each of the plurality of selective information and the corresponding content provider identifier in a debate format.

6. The computer-implemented method of claim 1, wherein the curated format is a juxtaposition of each of the plurality of selective information and the corresponding content provider identifier in a dialogue format.

7. A computer-implemented method to present a moderated interaction among a plurality of participant profiles, the method comprising:
generating, by an application server, a session on a social media application for an interaction between a plurality of participant profiles operating a plurality of computing devices, wherein the application server grants access to each participant user in the session upon authenticating each participant user;
transmitting, by the application server, an event identifier for the session, the event identifier is associated with a plurality of event parameters to each of the plurality of computing devices accessed by the plurality of participant profiles, the event parameters being two or more of event start time, event duration, event end time, and event topic;
transmitting, by the application server, a content provider identifier to each of a plurality of content provider profiles selected from the plurality of participant profiles;
receiving, by the application server during the session, and storing in a database a plurality of content files provided by the plurality of content provider profiles in response to the event identifier, each of the plurality of content files uniquely tagged with a content provider identifier associated with one of the content provider profiles;
assigning, by the application server, a moderator identifier to one of the plurality of participant profiles and providing authority to the participant profile associated with the moderator identifier to query the database to identify a plurality of selective information from the plurality of content files conforming to the event parameters;
receiving, by the application server, the plurality of selective information and providing an interface associated to the event identifier on one or more of the plurality of computing devices executing the social media application to present each of the plurality of selective information and corresponding content provider identifier in a curated format comprising a visibly demarcated beginning and an end; and
presenting, by the application server, the plurality of selective information in the curated format on the social media application running on a set of computing devices operated by a set of viewer profiles configured to only view the plurality of selective information.

8. The computer-implemented method of claim 7, wherein the curated format is a juxtaposition of each of the plurality of selective information and the corresponding content provider identifier in a dialogue format.

9. The computer-implemented method of claim 7, wherein the curated format is a juxtaposition of each of the plurality of selective information and the corresponding content provider identifier in a debate format.

10. The computer-implemented method of claim 7, wherein the curated format is a juxtaposition of each of the plurality of selective information and the corresponding content provider identifier in an interview format.

11. The computer-implemented method of claim 7, further comprising:
transmitting, by an application server, each of the plurality of selective information and the corresponding content provider identifier in the curated format to a social media platform server through a secure communication protocol.

12. The computer-implemented method of claim 7, wherein the application server receives the plurality of content files from the plurality of content provider profiles only during a time interval associated with the event identifier.

13. The computer-implemented method of claim 7, further comprising:
updating, by an application server, the interface associated with the event identifier on one or more of the plurality of computing devices to present each of the plurality of selective information and the corresponding content provider identifier in real-time.

14. A collaborative content creation system comprising:
two or more computing devices, each containing a processor configured to transmit a plurality of content files to an application server;
a database hosted by the application server comprising a non-transitory machine-readable storage medium to store the plurality of content files; and
an application server comprising a processor communicatively coupled to two or more computing devices, the database, and a social media platform server, and configured to execute a set of instructions to:
generate a session on a social media application for an interaction between a plurality of participant profiles operating a plurality of computing devices, wherein the application server grants access to each participant user in the session upon authenticating each participant user;
transmit an event identifier for the session, the event identifier is associated with a plurality of event parameters to each of the plurality of computing devices accessed by the plurality of participant profiles, the event parameters being two or more of event start time, event duration, event end time, and event topic;
select at least two content provider profiles from the plurality of participant profiles;
receive during the session and store in the database a plurality of content files provided by the computing devices of the at least two content provider profiles in response to the event identifier;
query the database to retrieve a plurality of selective information from the plurality of content files conforming to the event parameters;
transmit the plurality of selective information and corresponding content provider profile to two or more of the plurality of computing devices executing the social media application to render a user interface presenting each of the plurality of selective information and corresponding content provider profile in a curated format comprising a visibly demarcated beginning and an end;
transmit the curated output to the social media platform server through a secure communication protocol; and
present the plurality of selective information in the curated format on the social media application running on a set of computing devices operated by a set of viewer profiles configured to only view the plurality of selective information.

15. The collaborative content creation system of claim 14, wherein the social media platform server is a Twitter® server.

16. The collaborative content creation system of claim 14, wherein the two or more computing devices are communicatively coupled to the social media platform server.

17. The collaborative content creation system of claim 14, wherein the curated output is a juxtaposition of each of the plurality of selective information and the corresponding content provider identifier in a dialogue format.

18. The collaborative content creation system of claim 14, wherein the curated output is a juxtaposition of each of the plurality of selective information and the corresponding content provider identifier in a debate format.

19. The collaborative content creation system of claim 14, wherein the curated output is a juxtaposition of each of the plurality of selective information and the corresponding content provider identifier in an interview format.

20. The collaborative content creation system of claim 14, wherein the application server receives the plurality of content files from the plurality of content provider profiles only during a time interval associated with the event identifier.

* * * * *